(12) United States Patent
Tateishi et al.

(10) Patent No.: US 6,455,679 B1
(45) Date of Patent: Sep. 24, 2002

(54) AZO DYE, INK-JET RECORDING INK CONTAINING THE SAME, AND INK-JET RECORDING METHOD

(75) Inventors: Keiichi Tateishi; Toshiki Fujiwara; Yasushi Azuma, all of Kanagawa (JP)

(73) Assignee: Fuji Photo Film Co., Ltd., Minami-ashigara (JP)

( * ) Notice: Subject to any disclaimer, the term of this patent is extended or adjusted under 35 U.S.C. 154(b) by 0 days.

(21) Appl. No.: 09/919,937

(22) Filed: Aug. 2, 2001

(30) Foreign Application Priority Data

Aug. 7, 2000 (JP) ........................................ 2000-237911

(51) Int. Cl.$^7$ ...................... C09B 29/033; C09B 29/09; C09D 11/02
(52) U.S. Cl. ...................... 534/766; 534/775; 534/792; 534/793; 106/31.45; 106/31.48; 106/31.5
(58) Field of Search ................................. 534/766, 775, 534/792, 793; 106/31.45, 31.48, 31.5

(56) References Cited

U.S. PATENT DOCUMENTS

| | | | |
|---|---|---|---|
| 3,336,285 A | 8/1967 | Towne et al. | |
| 3,639,384 A | 2/1972 | Weaver et al. | |
| 5,144,015 A | 9/1992 | Chapman | |

FOREIGN PATENT DOCUMENTS

| | | | |
|---|---|---|---|
| EP | 716931 | * | 6/1996 |
| GB | 1 566 985 | | 5/1980 |
| JP | 6-19036 | | 3/1994 |
| JP | 10-259331 | * | 9/1998 |

OTHER PUBLICATIONS

Ishibashi, Chemical Abstracts, 129:303802, 1998.*

* cited by examiner

Primary Examiner—Fiona T. Powers
(74) Attorney, Agent, or Firm—Burns, Doane, Swecker & Mathis, LLP

(57) ABSTRACT

The present invention provides a novel heterylaniline azo dye as well as an ink-jet recording ink and an ink-jet recording method enabling the formation of an image having a good hue and high durability to light and ozone gas. The ink-jet recording ink contains a heterylaniline azo dye derivative having a novel structure. The ink-jet recording method is characterized in that an image is formed by using the ink described above on an image-receiving material comprising a support having thereon an ink-receiving layer containing white inorganic pigment particles.

20 Claims, No Drawings

AZO DYE, INK-JET RECORDING INK CONTAINING THE SAME, AND INK-JET RECORDING METHOD

BACKGROUND OF THE INVENTION

1. Field of the Invention

The present invention relates to a novel heterylaniline azo dye, an ink-jet recording ink containing the dye, and an ink-jet recording method.

2. Description of the Related Art

Image-recording materials containing specific dyes are mainly materials for forming images, and in particular color images. More specifically, these materials include ink-jet recording materials, heat-sensitive transfer-type image recording materials, pressure-sensitive recording materials, electrophotography recording materials, transfer-type silver halide photosensitive materials, printing inks, and recording pens. Preferably, these materials are ink-jet recording materials, heat-sensitive transfer-type image recording materials, and electrophotography recording materials. Further preferably, these materials are inkjet recording materials.

Because of inexpensive material costs, capability of high-speed recording, reduced noise in recording operations, and ease in color recording, ink-jet recording has rapidly come into wide use and is being further developed.

The ink-jet recording methods include a method in which liquid droplets, pressed by a piezoelectric element, are ejected, a method in which liquid droplets are ejected by bubbles generated in the ink by heat, a method in which ultrasonic waves are used, and a method in which liquid droplets are suction-ejected by electrostatic force. In these methods, water-based ink, oil-based ink, and solid (fusion-type) ink are used.

The properties required for the jet printing ink are high solubility in a solvent, capability of high-density recording, excellent hue, excellent durability with respect to light, heat, air (in particular $NO_x$, $SO_x$, and ozone), water, and chemicals, excellent fixation and little blur on image-receiving materials, excellent storability as ink, freedom from toxicity, high purity, and being inexpensive. However, it is very difficult to obtain a dye that highly satisfies these requirements. In particular, there is a strong demand for a dye that has a good magenta hue and exhibits excellent lightfastness and ozone gas resistance. Heretofore, various dyes have been disclosed as pyrazole azo dyes in Japanese Patent Application Laid-Open (JP-A) Nos. 55-161856, 61-36362, 61-152768, 6-145543, and 7-224230, U. S. Pat. Nos. 4,650,861 and 4,301,070, PCT National Publication No. 11-504958, and so on. However, none of these dyes meets the requirements of hue and fastness at the same time.

Further, pyrazole dyes are conventionally synthesized according to methods described in U. S. Pat. Nos. 3,336,285 and 3,639,384 and U.K. Patent 1,566,985. The above-mentioned U.S. Patents disclose a method in which a 1-alkyl-4-cyano-pyrazol-5-yl azo dye is synthesized by diazotization of 1-alkyl-4-cyano-5-aminopyrazole followed by coupling. However, since the diazonium salt in this method is very unstable, it is difficult to obtain the dye with high yield and high purity by this diazotization and coupling (Weaver and Shuttleworth, Dyes and Pigments 3, 81 (1982)). Japanese Patent Application Publication (JP-B) No. 6-19036 discloses a synthesis method in which 1-alkyl-3-(secondary or tertiary alkyl)-4-cyano-pyrazol-5-yl-azo dyes are obtained. These azo dyes are not preferable as magenta dyes, because their hues are in the short wavelength range.

In the method disclosed in U.K. Patent No. 1,566,985, a 1-alkyl-3-alkyl or aryl-4-cyano-pyrazol-5-yl-azo dye is synthesized by dizaotization of 1-alkyl-3-alkyl or aryl-4-halogeno-5-aminopyrazole with an aromatic coupling component, followed by coupling, and then substitution of halogen in the 4-position with cyanide. However, this method uses a harmful heavy metal cyanide such as CuCN and $Zn(CN)_2$, and so there are problems with disposal of waste and purification of the resulting dye.

SUMMARY OF THE INVENTION

It is accordingly the task of the present invention to overcome the problems in the prior art and to achieve the following objective. That is, the objective of the present invention is (1) to provide a novel heterylaniline azo dye derivative having a specific structure which is useful as a dye for ink jet printing ink or as an intermediate for synthesis of the dye and can also be an intermediate for useful chemical, medical, or agricultural organic chemical compounds and (2) to provide an ink-jet recording ink and an ink-jet recording method which, by use of the heterylaniline azo dye derivative, enable the formation of images having excellent hue and excellent durability with respect to light and ozone gas.

The present inventors have carefully studied the heterylaniline azo dye derivative having excellent hue and excellent lightfastness. As a result, they have found that the above-mentioned problems can be solved by the azo dye which is represented by the following general formula (I) and has a dye structure bearing a specific substituent hitherto unknown. Based on this finding, they have achieved the present invention. The means for solving the above-mentioned problems are as follows.

That is, the first aspect of the present invention is an ink-jet recording ink containing the azo dye represented by the following general formula (I):

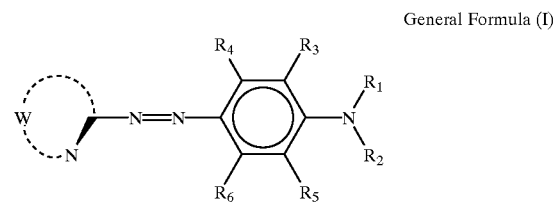

General Formula (I)

In the general formula (I), $R_1$ represents a substituted or unsubstituted aryl group or a substituted or unsubstituted heterocyclic group; $R_2$ represents a hydrogen atom, a substituted or unsubstituted alkyl group, a substituted or unsubstituted aryl group, a substituted or unsubstituted cycloalkyl group, a substituted or unsubstituted alkenyl group, a substituted or unsubstituted aralkyl group, or a substituted or unsubstituted heterocyclic group; $R_3$, $R_4$, $R_5$, and $R_6$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imide group, a heterocyclothio group, a sulfinyl group, a phosphoryl group, an acyl group, or an ionic hydrophilic group, which groups may each have a substituent; any of $R_1$ and $R_2$, $R_3$ and $R_1$, and $R_2$ and $R_5$ may be bonded to form a ring; and W represents a group of atoms necessary for forming a nitrogen-containing 5- to 6-membered heterocycle which may be condensed with other ring to form a condensed ring.

Any one group of $R_1$ and $R_2$, $R_3$ and $R_1$, and $R_2$ and $R_5$ in the general formula (I) may form a ring indicated by one of the following formulae:

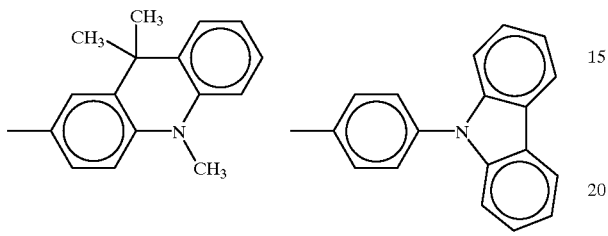

In the ink-jet recording ink according to the first aspect, the azo dye represented by the general formula (I) is preferably an azo dye represented by the general formula (II):

General Formula (II)

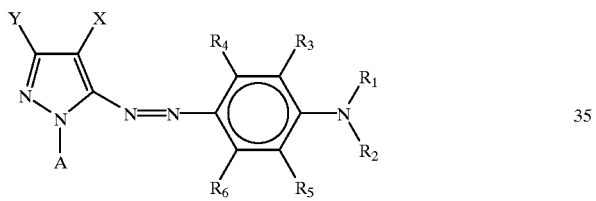

In the general formula (II), $R_1$, $R_2$, $R_3$, $R_4$, $R_5$, and $R_6$ are defined in the same way as $R_1$, $R_2$, $R_3$, $R_4$, $R_5$, and $R_6$ in the general formula (I), respectively; X represents an electron-withdrawing group having a Hammett's constant $\sigma_p$ of 0.20 or greater; Y represents a substituted or unsubstituted secondary or tertiary alkyl group, a substituted or unsubstituted aryl group, or a substituted or unsubstituted heterocyclic group; and A represents a group made up of nonmetallic atoms necessary for forming a 5- to 8-membered ring which may have a substituent and may be a saturated ring or may have an unsaturated bond.

In an ink-jet recording ink, A in the general formula (II) is preferably represented by any one of the following general formulae (III):

General Formulae (III)

(III-1)

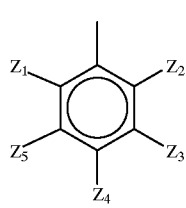

(III-2)

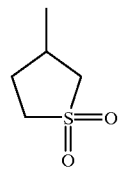

(III-3)

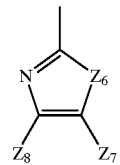

(III-4)

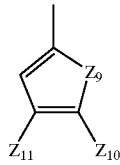

(III-5)

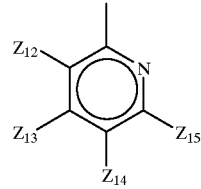

(III-6)

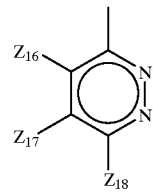

(III-7)

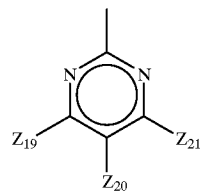

(III-8)

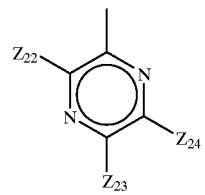

(III-9)

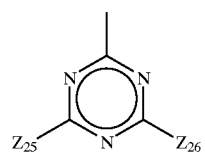

In the general formulae (III), $Z_1$, $Z_2$, $Z_3$, $Z_4$, $Z_5$, $Z_7$, $Z_8$, $Z_{10}$, $Z_{11}$, $Z_{12}$, $Z_{13}$, $Z_{14}$, $Z_{15}$, $Z_{16}$, $Z_{17}$, $Z_{18}$, $Z_{19}$, $Z_{20}$, $Z_{21}$, $Z_{22}$, $Z_{23}$, $Z_{24}$, $Z_{25}$, and $Z_{26}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imide group, a heterocyclothio group, a sulfinyl group, a phosphoryl group, an acyl group, or an ionic hydrophilic group; and $Z_6$ and $Z_9$ each independently represents —$NR_7$—, an oxygen atom, or a sulfur atom, where $R_7$ represents a hydrogen atom or a substituent.

Another aspect of the present invention is an ink-jet recording method in which an image is formed using the ink-jet recording ink according to the first aspect on an image-receiving material comprising a support having thereon an ink-receiving layer containing white inorganic pigment particles.

Another aspect of the present invention is an azo dye represented by the general formula (IV):

General Formula (IV)

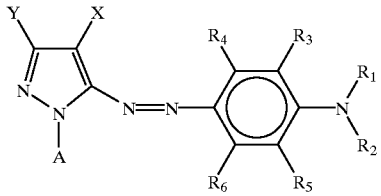

In the general formula (IV), X represents an electron-withdrawing group having a Hammett's constant $\sigma_p$ of 0.20 or greater; $R_1$ represents a substituted or unsubstituted aryl group or a substituted or unsubstituted heterocyclic group; $R_2$ represents a hydrogen atom, a substituted or unsubstituted alkyl group, a substituted or unsubstituted aryl group, a substituted or unsubstituted cycloalkyl group, a substituted or unsubstituted alkenyl group, a substituted or unsubstituted aralkyl group, or a substituted or unsubstituted heterocyclic group; $R_3$, $R_4$, $R_5$, and $R_6$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imide group, a heterocyclothio group, a sulfinyl group, a phosphoryl group, an acyl group, or an ionic hydrophilic group, which groups may each have a substituent; any of $R_1$ and $R_2$, $R_3$ and $R_1$, and $R_2$ and $R_5$ may be bonded to form a ring; Y represents a substituted or unsubstituted secondary or tertiary alkyl group, a substituted or unsubstituted aryl group, or a substituted or unsubstituted heterocyclic group; and A represents a group made up of nonmetallic atoms necessary for forming a 5- to 8-membered ring which may have a substituent and may be a saturated ring or may have an unsaturated bond.

DESCRIPTION OF THE PREFERRED EMBODIMENTS

The details of the present invention are explained below.

First, Hammett's constant of substitution $\sigma_p$ used herein is explained. The Hammett's rule is an empirical rule proposed by L. P. Hammett in 1935 to quantitatively describe the effect of a substituent on the reaction or equilibrium of a benzene derivative. Presently, the appropriateness of this rule is widely acknoledged. There are $\sigma_p$ and $\sigma_m$ as constants of substitution obtained by the Hammett's rule. These values are described in many common books. For example, details of these values are described in "Lange's Handbook of Chemistry", edited by J. A. Dean, 12th edition, 1979 (McGraw-Hill), and "Extra issue of Kagakuno Ryoiki", No.122, pp.96–103, 1979 (Nankodo Publishing Co., Ltd.). In the present invention, substituents are defined and explained using Hammett's constant of substitution $\sigma_p$. However, it must be noted that substituents are not necessarily limited to the substituents having Hammett's constants which are known and described in the literature. Therefore, needless to say, even if the Hammett's constant of a substituent is not described in the literature, the substituent whose Hammett's constant falls within the range when measured based on the Hammett's rule is included in the scope of the present invention. Although the compounds represented by the general formula (I) or (II) of the present invention are not benzene derivatives, the values of $\sigma_p$ are each used as a measure indicating the electronic effect of a substituent irrespective of the position of the substitution.

In the present invention, the values of $\sigma_p$ are used as stated above.

[Azo dyes]

First, the azo dyes represented by the general formula (I) in the present invention are explained in detail.

General Formula (I)

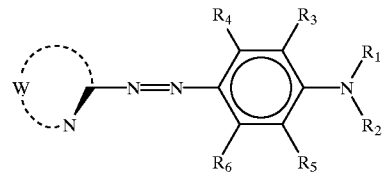

In the general formula (I), $R_1$ represents a substituted or unsubstituted aryl group or a substituted or unsubstituted heterocyclic group.

$R_1$ may further have a substituent, and examples of such substituent include the following.

A halogen atom (e.g., a chlorine, or bromine atom), a straight-chain or branched alkyl group having 1 to 12 carbon atoms, an aralkyl group having 7 to 18 carbon atoms, an alkenyl group having 2 to 12 carbon atoms, a straight-chain or branched alkynyl group having 2 to 12 carbon atoms, a straight-chain or branched cycloalkyl group having 3 to 12 carbon atoms, a straight-chain or branched cycloalkenyl group having 3 to 12 carbon atoms (e.g., methyl, ethyl, propyl, isopropyl, t-butyl, 2-methanesulfonylethyl, 3-phenoxypropyl, trifluoromethyl, or cyclopentyl), an aryl group (e.g., phenyl, 4-t-butylphenyl, or 2,4-di-t-amylphenyl), a heterocyclic group (e.g., imidazolyl, pyrazolyl, triazolyl, 2-furyl, 2-thienyl, 2-pyrimidinyl, or 2-benzothiazolyl), a cyano group, a hydroxyl group, a nitro group, a carboxyl group, an amino group, an alkyloxy group (e.g., methoxy, ethoxy, 2-methoxyethoxy, or 2-methanesulfonylethoxy), an aryloxy group (e.g., phenoxy, 2-methylphenoxy, 4-t-butylphenoxy, 3-nitrophenoxy, 3-t-butyloxycarbamoylphenoxy, or 3-methoxycarbamoyl), an acylamino group (e.g., acetamide, benzamide, or 4-(3-t-butyl-4-hydroxyphenoxy)butaneamide), an alkylamino group (e.g., methylamino, butylamino, diethylamino, or methylbutylamino), an anilino group (e.g., phenylanilino or 2-chloroanilino), a ureido group (e.g., phenylureido, methylureido, or N,N-dibutylureido), a sulfamoylamino group (e.g., N,N-dipropylsulfamoylamino), an alkylthio group (e.g., methylthio, octylthio, or 2-phenoxyethylthio), an arylthio group (e.g., phenylthio, 2-butoxy-5-t-octylphenylthio, or 2-carboxyphenylthio), an alkyloxycarbonylamino group (e.g., methoxycarbonylamino), a sulfonamide group (e.g., methanesulfonamide, benzenesulfoneamide, p-toluenesulfonamide, or octadecanesulfonamide), a carbamoyl group (e.g., N-ethylcarbamoyl or N,N-dibutylcarbamoyl), a sulfamoyl group (e.g., N-ethylsulfamoyl, N,N-dipropylsulfamonyl, or N,N-diethylsulfamoyl), a sulfonyl group (e.g., methanesulfonyl, octanesulfonyl, benzenesulfonyl, or toluenesulfonyl), an alkyloxycarbonyl group (e.g., methoxycarbonyl or t-butyloxycarbonyl), a heterocyclooxy group (e.g., 1-phenyltetrazole-5-oxy or 2-tetrahydropyranyloxy), an azo group (e.g., phenylazo, 4-methoxyphenylazo, 4-pivaloylaminophenylazo, or 2-hydroxy-4-propanoylphenylazo), an acyloxy group (e.g., acetoxy), a carbamoyloxy group (e.g., N-methylcarbamoyloxy or N-phenylcarbamoyloxy), a silyloxy group (e.g., trimethylsilyloxy or dibutylmethylsilyloxy), an aryloxycarbonylamino group (e.g., phenoxycarbonylamino), an imide group (e.g., N-succinimide or N-phthalimide), a heterocyclothio group (e.g., 2-benzothiazolylthio, 2,4-di-phenoxy-1,3,5-triazole-6-thio, or 2-pyridylthio), a sulfinyl group (e.g., 3-phenoxypropylsulfinyl), a phosphonyl group (e.g., phenoxyphosphonyl, octyloxyphosphonyl, or phenylphosphonyl), an aryloxycarbonyl group (e.g., phenoxycarbonyl), an acyl group (e.g., acetyl, 3-phenylpropanoyl, or benzoyl), and an ionic hydrophilic group (e.g., carboxyl, sulfo, or quaternary ammonium).

The aryl groups represented by $R_1$ include an aryl group having a substituent and an aryl group having no substituent. The aryl groups are preferably aryl groups having 6 to 12 carbon atoms. Examples of the substituent include an alkyl group, an alkoxy group, a halogen atom, an alkylamino group, and an ionic hydrophilic group. Examples of the aryl groups include phenyl, p-tolyl, p-methoxyphenyl, o-chlorophenyl, p-chlorophenyl, and 2,4,6-trimethylphenyl.

The heterocyclic groups represented by $R_1$ include a heterocyclic group having a substituent and a heterocyclic group having no substituent. The heterocyclic groups are preferably 5- or 6-membered heterocyclic groups. Examples of the substituent include an ionic hydrophilic group. Examples of the heterocyclic groups include a 2-pyridyl group, a 3-pyridyl group, a 2-thienyl group, and a 3-furyl group.

In the general formula (I), $R_2$ represents a hydrogen atom, a substituted or unsubstituted alkyl group, a substituted or unsubstituted aryl group, a substituted or unsubstituted cycloalkyl group, a substituted or unsubstituted alkenyl group, a substituted or unsubstituted aralkyl group, or a substituted or unsubstituted heterocyclic group.

$R_2$ may further have a substituent selected, for example, from the groups represented by $R_1$.

The alkyl groups represented by $R_2$ include an alkyl group having a substituent and an alkyl group having no substituent. Preferably, the alkyl groups are alkyl groups having 1 to 12 carbon atoms. More preferably, the alkyl groups are alkyl groups having 1 to 6 carbon atoms. Examples of the substituent include a hydroxyl group, an alkoxy group, a cyano group, a halogen atom, and an ionic hydrophilic group. Examples of the alkyl group include methyl, ethyl, butyl, isopropyl, t-butyl, hydroxyethyl, methoxyethyl, cyanoethyl, trifluoromethyl, 3-sulfopropyl, and 4-sulfobutyl.

The aryl groups represented by $R_2$ include an aryl group having a substituent and an aryl group having no substituent. The aryl groups are preferably aryl groups having 6 to 12 carbon atoms. Examples of the substituent include an alkyl group, an alkoxy group, a halogen atom, an alkylamino group, and an ionic hydrophilic group. Examples of the aryl groups include phenyl, p-tolyl, p-methoxyphenyl, and p-chlorophenyl.

The cycloalkyl groups represented by $R_2$ include a cycloalkyl group having a substituent and a cycloalkyl group having no substituent. The cycloalkyl groups are preferably cycloalkyl groups having 5 to 12 carbon atoms. Examples of the substituent include an ionic hydrophilic group. Examples of the cycloalkyl groups include a cyclohexyl group.

The alkenyl groups represented by $R_2$ include an alkenyl group having a substituent and an alkenyl group having no substituent. The alkenyl groups are preferably alkenyl groups having 2 to 12 carbon atoms. Examples of the substituent include an ionic hydrophilic group. Examples of the alkenyl groups include a vinyl group and an allyl group.

The aralkyl groups represented by $R_2$ include an aralkyl group having a substituent and an aralkyl group having no substituent. The aralkyl groups are preferably aralkyl groups having 7 to 12 carbon atoms. Examples of the substituent include an ionic hydrophilic group. Examples of the aralkyl groups include a benzyl group and a 2-phenethyl group.

The heterocyclic groups represented by $R_2$ include a heterocyclic group having a substituent and a heterocyclic group having no substituent. The heterocyclic groups are preferably 5- or 6-membered heterocyclic groups. Examples of the substituent include an ionic hydrophilic group. Examples of the heterocyclic groups include a 2-pyridyl group, a 2-thienyl group, and a 2-fury group.

In the general formula (I), $R_3$, $R_4$, $R_5$, and $R_6$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imide group, a heterocyclothio group, a sulfinyl group, a phosphoryl group, an acyl group, or an ionic hydrophilic group.

Among the groups listed above, a hydrogen atom, a halogen atom, an alkyl group, an aryl group, a cyano group, an alkoxy group, an amide group, a ureido group, an alkoxycarbonylamino group, a sulfonamide group, a carbamoyl group, a sulfamoyl group, and an alkoxycarbonyl group are preferable.

Further, a hydrogen atom, a halogen atom, an alkyl group, an alkoxy group, an amide group, a ureido group, a sulfonamide group, a carbamoyl group, and a sulfamoyl group are particularly preferable.

$R_3$, $R_4$, $R_5$, and $R_6$ may further have a substituent selected, for example, from the groups represented by $R_1$.

The halogen atoms represented by $R_3$, $R_4$, $R_5$, or $R_6$ include a fluorine atom, a chlorine atom, and a bromine atom.

The alkyl groups represented by $R_3$, $R_4$, $R_5$, or R6 include an alkyl group having a substituent and an alkyl group having no substituent. The alkyl groups are preferably alkyl groups having 1 to 12 carbon atoms. Examples of the substituent include a hydroxyl group, an alkoxy group, a cyano group, a halogen atom, and an ionic hydrophilic group. Examples of the alkyl groups include methyl, ethyl, butyl, isopropyl, t-butyl, hydroxyethyl, methoxyethyl, cyanoethyl, trifluoromethyl, 3-sulfopropyl, and 4-sulfobutyl.

The cycloalkyl groups represented by $R_3$, $R_4$, $R_5$, or $R_6$ include a cycloalkyl group having a substituent and a cycloalkyl group having no substituent. The cycloalkyl groups are preferably cycloalkyl groups having 5 to 12 carbon atoms. Examples of the substituent include an ionic hydrophilic group. Examples of the cycloalkyl groups include a cyclohexyl group.

The alkenyl groups represented by $R_3$, $R_4$, $R_5$, or $R_6$ include an alkenyl group having a substituent and an alkenyl group having no substituent. The alkenyl groups are preferably alkenyl groups having 2 to 12 carbon atoms. Examples of the substituent include an ionic hydrophilic group. Examples of the alkenyl groups include a vinyl group and an allyl group.

The aralkyl groups represented by $R_3$, $R_4$, $R_5$, or $R_6$ include an aralkyl group having a substituent and an aralkyl group having no substituent. The aralkyl groups are preferably aralkyl groups having 7 to 12 carbon atoms. Examples of the substituent include an ionic hydrophilic group. Examples of the aralkyl groups include a benzyl group and a 2-phenethyl group.

The aryl groups represented by $R_3$, $R_4$, $R_5$, or $R_6$ include an aryl group having a substituent and an aryl group having no substituent. The aryl groups are preferably aryl groups having 7 to 12 carbon atoms. Examples of the substituent include an alkyl group, an alkoxy group, a halogen atom, an alkylamino group, and an ionic hydrophilic group. Examples of the aryl groups include phenyl, p-tolyl, p-methoxyphenyl, o-chlorophenyl, and m-(3-sulfopropylamino)phenyl.

The heterocyclic groups represented by $R_3$, $R_4$, $R_5$, or $R_6$ include a heterocyclic group having a substituent and a heterocyclic group having no substituent. The heterocyclic groups are preferably 5- or 6-membered heterocyclic groups. Examples of the substituent include an ionic hydrophilic group. Examples of the heterocyclic groups include a 2-pyridyl group, a 2-thienyl group, and a 2-fury group.

The alkylamino groups represented by $R_3$, $R_4$, $R_5$, or $R_6$ include an alkylamino group having a substituent and an alkylamino group having no substituent. The alkylamino groups are preferably alkylamino groups having 1 to 6 carbon atoms. Examples of the substituent include an ionic hydrophilic group. Examples of the alkylamino groups include a methylamino group and a diethylamino group.

The alkoxy groups represented by $R_3$, $R_4$, $R_5$, or $R_6$ include an alkoxy group having a substituent and an alkoxy group having no substituent. The alkoxy groups are preferably alkoxy groups having 1 to 12 carbon atoms. Examples of the substituent include an alkoxy group, a hydroxyl group, and an ionic hydrophilic group. Examples of the alkoxy groups include a methoxy group, an ethoxy group, an isopropoxy group, a methoxyethoxy group, a hydroxyethoxy group, and a 3-carboxypropoxy group.

The aryloxy groups represented by $R_3$, $R_4$, $R_5$, or $R_6$ include an aryloxy group having a substituent and an aryloxy group having no substituent. The aryloxy groups are preferably aryloxy groups having 6 to 12 carbon atoms. Examples of the substituent include an alkoxy group and an ionic hydrophilic group. Examples of the aryloxy groups include a phenoxy group, a p-methoxyphenoxy group, and an o-methoxyphenoxy group.

The amide groups represented by $R_3$, $R_4$, $R_5$, or $R_6$ include an amide group having a substituent and an amide group having no substituent. The amide groups are preferably amide groups having 2 to 12 carbon atoms. Examples of the substituent include an ionic hydrophilic group. Examples of the amide groups include an acetamide group, a propionamide group, a benzamide group, and a 3,5-disulfobenzamide group.

The arylamino groups represented by $R_3$, $R_4$, $R_5$, or $R_6$ include an arylamino group having a substituent and an arylamino group having no substituent. The arylamino groups are preferably arylamino groups having 6 to 12 carbon atoms. Examples of the substituent include a halogen atom and an ionic hydrophilic group. Examples of the arylamino groups include an anilino group and a 2-chloroanilino group.

The ureido groups represented by $R_3$, $R_4$, $R_5$, or $R_6$ include a ureido group having a substituent and a ureido group having no substituent. The ureido groups are preferably ureido groups having 1 to 12 carbon atoms. Examples of the substituent include an alkyl group and an aryl group. Examples of the ureido groups include a 3-methylureido group, a 3,3-dimethylureido group, and a 3-phenylureido group.

The sulfamoylamino groups represented by $R_3$, $R_4$, $R_5$, or R6 include a sulfamoylamino group having a substituent and a sulfamoylamino group having no substituent. Examples of the substituent include an alkyl group. Examples of the sulfamoylamino groups include an N,N-dipropylsulfamoylamino group.

The alkylthio groups represented by $R_3$, $R_4$, $R_5$, or $R_6$ include an alkylthio group having a substituent and an alkylthio group having no substituent. The alkylthio groups are preferably alkylthio groups having 1 to 12 carbon atoms. Examples of the substituent include an ionic hydrophilic group. Examples of the alkylthio groups include a methylthio group and an ethylthio group.

The arylthio groups represented by $R_3$, $R_4$, $R_5$, or $R_6$ include an arylthio group having a substituent and an arylthio group having no substituent. The arylthio groups are preferably arylthio groups having 6 to 12 carbon atoms. Examples of the substituent include an alkyl group and an ionic hydrophilic group. Examples of the arylthio groups include a phenylthio group and a p-tolylthio group.

The alkoxycarbonylamino groups represented by $R_3$, $R_4$, $R_5$, or $R_6$ include an alkoxycarbonylamino group having a substituent and an alkoxycarbonylamino group having no substituent. The alkoxycarbonylamino groups are preferably alkoxycarbonylamino groups having 2 to 12 carbon atoms. Examples of the substituent include an ionic hydrophilic group. Examples of the alkoxycarbonylamino groups include an ethoxycarbonylamino group.

The sulfonamide groups represented by $R_3$, $R_4$, $R_5$, or $R_6$ include a sulfonamide group having a substituent and a sulfonamide group having no substituent. The sulfonamide groups are preferably sulfonamide groups having 1 to 12 carbon atoms. Examples of the substituent include an ionic hydrophilic group. Examples of the sulfonamide groups include a methanesulfonamide group, a benzenesulfonamide group, and a 3-carboxybenzenesulfonamide group.

The carbamoyl groups represented by $R_3$, $R_4$, $R_5$, or $R_6$ include a carbamoyl group having a substituent and a carbamoyl group having no substituent. Examples of the substituent include an alkyl group. Examples of the carbamoyl groups include a methylcarbamoyl group and a dimethylcarbamoyl group.

The sulfamoyl groups represented by $R_3$, $R_4$, $R_5$, or $R_6$ include a sulfamoyl group having a substituent and a sulfamoyl group having no substituent. Examples of the substituent include an alkyl group. Examples of the sulfamoyl groups include a dimethylsulfamoyl group and a di-(2-hydroxyethyl)sulfamoyl group.

The sulfonyl groups represented by $R_3$, $R_4$, $R_5$, or $R_6$ include a methanesulfonyl group and a phenylsulfonyl group.

The alkoxycarbonyl groups represented by $R_3$, $R_4$, $R_5$, or $R_6$ include an alkoxycarbonyl group having a substituent and an alkoxycarbonyl group having no substituent. The alkoxycarbonyl groups are preferably alkoxycarbonyl groups having 2 to 12 carbon atoms. Examples of the substituent include an ionic hydrophilic group. Examples of the alkoxycarbonyl groups include a methoxycarbonyl group and an ethoxycarbonyl group.

The heterocyclooxy groups represented by $R_3$, $R_4$, $R_5$, or $R_6$ include a heterocyclooxy group having a substituent and a heterocyclooxy group having no substituent. The heterocyclooxy groups are preferably heterocyclooxy groups having a 5- or 6-membered heterocycle. Examples of the substituent include a hydroxyl group and an ionic hydrophilic group. Examples of the heterocyclooxy groups include a 2-tetrahydropyranyloxy group.

The azo groups represented by $R_3$, $R_4$, $R_5$, or $R_6$ include an azo group having a substituent and an azo group having no substituent. Examples of the azo groups include a p-nitrophenyl azo group.

The acyloxy groups represented by $R_3$, $R_4$, $R_5$, or $R_6$ include an acyloxy group having a substituent and an acyloxy group having no substituent. The acyloxy groups are preferably acyloxy groups having 1 to 12 carbon atoms. Examples of the substituent include an ionic hydrophilic group. Examples of the acyloxy groups include an acetoxy group and a benzoyloxy group.

The carbamoyloxy groups represented by $R_3$, $R_4$, $R_5$, or $R_6$ include a carbamoyloxy group having a substituent and a carbamoyloxy group having no substituent. Examples of the substituent include an alkyl group. Examples of the carbamoyloxy groups include an N-methylcarbamoyloxy group.

The silyloxy groups represented by $R_3$, $R_4$, $R_5$, or $R_6$ include a silyloxy group having a substituent and a silyloxy group having no substituent. Examples of the substituent include an alkyl group. Examples of the silyloxy groups include a trimethylsilyloxy group.

The aryloxycarbonyl groups represented by $R_3$, $R_4$, $R_5$, or $R_6$ include an aryloxycarbonyl group having a substituent and an aryloxycarbonyl group having no substituent. The aryloxycarbonyl groups are preferably aryloxycarbonyl groups having 7 to 12 carbon atoms. Examples of the substituent include an ionic hydrophilic group. Examples of the aryloxycarbonyl groups include a phenoxycarbonyl group.

The aryloxycarbonylamino groups represented by $R_3$, $R_4$, $R_5$, or $R_6$ include an aryloxycarbonylamino group having a substituent and an aryloxycarbonylamino group having no substituent. The aryloxycarbonylamino groups are preferably aryloxycarbonylamino groups having 7 to 12 carbon atoms. Examples of the substituent include an ionic hydrophilic group. Examples of the aryloxycarbonylamino groups include a phenoxycarbonylamino group.

The imide groups represented by $R_3$, $R_4$, $R_5$, or $R_6$ include an imide group having a substituent and an imide group having no substituent. Examples of the imide groups include an N-phthalimide group and an N-succinimide group.

The heterocyclothio groups represented by $R_3$, $R_4$, $R_5$, or $R_6$ include a heterocyclothio group having a substituent and a heterocyclothio group having no substituent. The heterocyclothio groups preferably have a 5- or 6-membered heterocycle. Examples of the substituent include an ionic hydrophilic group. Examples of the heterocyclothio groups include a 2-pyridylthio group.

The sulfinyl groups represented by $R_3$, $R_4$, $R_5$, or $R_6$ include a sulfinyl group having a substituent and a sulfinyl group having no substituent. Examples of the sulfinyl groups include a phenylsulfinyl group.

The phosphoryl groups represented by $R_3$, $R_4$, $R_5$, or $R_6$ include a phosphoryl group having a substituent and a phosphoryl group having no substituent. Examples of the phosphoryl groups include a phenoxyphosphoryl group and a phenylphosphoryl group.

The acyl groups represented by $R_3$, $R_4$, $R_5$, or $R_6$ include an acyl group having a substituent and an acyl group having no substituent. The acyl groups are preferably acyl groups having 1 to 12 carbon atoms. Examples of the substituent include an ionic hydrophilic group. Examples of the acyl groups include an acetyl group and a benzoyl group.

The ionic hydrophilic groups represented by $R_3$, $R_4$, $R_5$, or $R_6$ include a carboxyl group, a sulfo group, and a quaternary ammonium group. The ionic hydrophilic groups are preferably a carboxyl group and a sulfo group and particularly preferably a sulfo group. The carboxyl group and sulfo group may each be in a state of a salt. Examples of the counter ion that forms the salt include alkali metal ions (e.g., sodium ion and potassium ion) and organic cations (e.g., tetramethylguanidinium ion).

In the general formula (I), $R_1$ and $R_2$, $R_3$ and $R_1$, and $R_2$ and $R_5$ may each form a ring. If the ring is formed, preferred examples of the ring are given below.

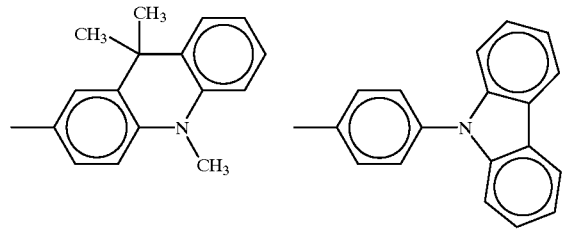

In the general formula (I), W represents a group of atoms necessary for forming a nitrogen-containing, 5- to 6-membered heterocycle (this ring may be condensed with other ring to form a condensed ring).

Preferred examples of the nitrogen-containing heterocycle, which is made up of W, and the condensed ring of the heterocycle in the general formula (I) include imidazole, benzimidazole, pyrazole, triazole, thiazole, benzothiazole, isothiazole, benzisothiazole, oxazole, benzoxazole, thiadiazole, 3H-pyrrole, 3H-indole, isoxazole, and benzisoxazole. Pyrazole, triazole, isothiazole, and thiadiazole are preferable. Pyrazole is particularly preferable.

In the azo dyes represented by the general formula (I) preferable combinations of the substituents are as follows. $R_1$ is preferably an aryl group or a heterocyclic group (which may have an ionic hydrophilic group as a substituent) and is particularly preferably an aryl group. $R_2$ is preferably an alkyl group or an aryl group (which may have an ionic hydrophilic group as a substituent) and is particularly preferably an aryl group. $R_3$, $R_4$, and $R_5$ are each a hydrogen atom. $R_6$ is an amide group, a ureido group, a sulfamoylamino group, an alkoxycarbonylamino group, or a sulfonamide group, more preferably an amide group, a ureido group, or a sulfonamide group, and is particularly preferably an amide group (which may have an ionic hydrophilic group as a substituent). The nitrogen-containing heterocycle made up of W is preferably pyrazole, triazole, isothiazole, or thiadiazole and is particularly preferably pyrazole.

The preferred combinations of the substituents of the compound represented by the general formula (I) are as follows. The compound in which at least one of the substituents is the preferable group described above is preferable; the compound in which more of the substituents are the preferable groups described above is more preferable; and compound in which all of the substituents are the preferable groups described above is most preferable.

Among the azo compounds represented by the general formula (I), the azo compounds having the structures represented by the following general formula (II) are preferable. The azo compounds represented by the general formula (II) of the present invention are explained in detail below.

General Formula (II)

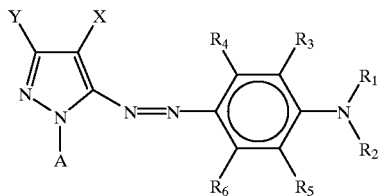

In the general formula (II), $R_1$, $R_2$, $R_3$, $R_4$, $R_5$, and $R_6$ are defined in the same way as $R_1$, $R_2$, $R_3$, $R_4$, $R_5$, and $R_6$ in the general formula (I), respectively. The same applies to the preferred examples of $R_1$, $R_2$, $R_3$, $R_4$, $R_5$, and $R_6$.

In the general formula (II), X represents an electron-withdrawing group whose Hammett substitution constant $\sigma_p$ is 0.20 or greater and preferably 0.30 or greater. The upper limit of the constant is 1.0 for the electron-withdrawing group.

Specific examples of the electron-withdrawing group X which has a Hammett's constant $\sigma_p$ of 0.20 or greater include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with other electron-withdrawing group having a a value of 0.20 or greater, a heterocyclic group, a halogen atom, an azo group, and a selenocyanate group.

X may further have a substituent, and examples of the substituent include those listed as the examples of $R_1$.

Preferred examples of X include an acyl group having 2 to 12 carbon atoms, an acyloxy group having 2 to 12 carbon atoms, a carbamoyl group having 1 to 12 carbon atoms, an alkyloxycarbonyl group having 2 to 12 carbon atoms, an aryloxycarbonyl group having 7 to 18 carbon atoms, a cyano group, a nitro group, an alkylsulfinyl group having 1 to 12 carbon atoms, an arylsulfinyl group having 6 to 18 carbon atoms, an alkylsulfonyl group having 1 to 12 carbon atoms, an arylsulfonyl group having 6 to 18 carbon atoms, a sulfamoyl group having 0 to 12 carbon atoms, a halogenated alkyl group having 1 to 12 carbon atoms, a halogenated alkyloxy group having 1 to 12 carbon atoms, a halogenated alkylthio group having 1 to 12 carbon atoms, a halogenated aryloxy group having 7 to 18 carbon atoms, an aryl group having 7 to 18 carbon atoms and substituted with two or more other electron-withdrawing groups each having a $\sigma_p$ value of 0.20 or greater, and a 5- to 8-membered heterocyclic group having a nitrogen, oxygen, or sulfur atom and 1 to 18 carbon atoms.

More preferred examples of X are an alkyloxycarbonyl group having 2 to 12 carbon atoms, a nitro group, a cyano group, an alkylsulfonyl group having 1 to 12 carbon atoms, an arylsulfonyl group having 6 to 18 carbon atoms, a carbamoyl group having 1 to 12 carbon atoms, and a halogenated alkyl group having 1 to 12 carbon atoms. Particularly preferred examples of X are a cyano group, an alkylsulfonyl group having 1 to 12 carbon atoms, and an arylsulfonyl group having 6 to 18 carbon atoms. The most preferred example of X is a cyano group.

In the general formula (II), Y represents a substituted or unsubstituted secondary or tertiary alkyl group, a substituted or unsubstituted aryl group, or a substituted or unsubstituted heterocyclic group. Preferably, Y represents a secondary or tertiary alkyl group, or an aryl group. Most preferably, Y represents a tertiary alkyl group. Specifically, Y represents an isopropyl group, a t-butyl group, a phenyl group, or a benzothiazolyl group. Most preferably, Y represents a tertiary alkyl group. These substituents may further have substituents which include a hydroxyl group, an alkoxy group, a cyano group, a halogen atom, and an ionic hydrophilic group.

In the general formula (II), A represents a group made up of nonmetallic atoms necessary for forming a 5- to 8-membered ring which may have a substituent and may be a saturated ring or may have an unsaturated bond. Preferred examples of the nonmetallic atoms include a nitrogen atom, an oxygen atom, a sulfur atom, and a carbon atom.

Examples of the ring made up of A include a benzene ring, a cyclopentane ring, a cyclohexane ring, a cycloheptane ring, a cyclooctane ring, a cyclohexene ring, a pyridine ring, a piperazine ring, an oxane ring, and a thiane ring. These rings may further have substituents such as those listed as examples of the substituents $R_3$, $R_4$, $R_5$, and $R_6$.

The ring made up of A is preferably one of the substituents (III-1 to III-9) represented by any one of the following general formulae (III):

General Formulae (III)

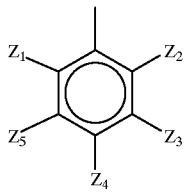 (III-1)

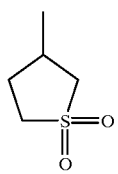 (III-2)

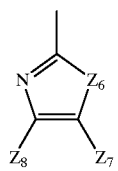 (III-3)

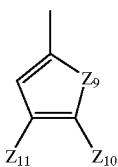 (III-4)

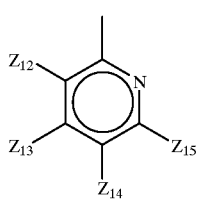 (III-5)

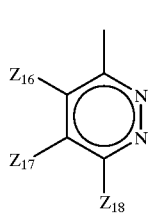 (III-6)

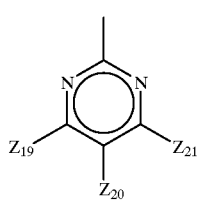 (III-7)

-continued

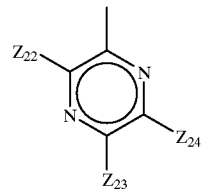 (III-8)

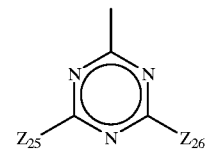 (III-9)

In the general formulae (III), $Z_1$, $Z_2$, $Z_3$, $Z_4$, and $Z_5$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imide group, a heterocyclothio group, a sulfinyl group, a phosphoryl group, an acyl group, or an ionic hydrophilic group.

Specific examples of $Z_1$, $Z_2$, $Z_3$, $Z_4$, and $Z_5$ include the groups such as those listed as examples of the substituents $R_3$, $R_4$, $R_5$, and $R_6$ in the general formula (I).

Preferred examples of $Z_1$, $Z_2$, $Z_3$, $Z_4$, and $Z_5$ are each a hydrogen atom, a halogen atom, an alkyl group, an aryl group, a cyano group, a nitro group, an alkoxy group, an amide group, a ureido group, a sulfamoylamino group, an alkoxycarbonylamino group, a sulfonamide group, a carbamoyl group, a sulfamoyl group, a sulfonyl group, an alkoxycarbonyl group, an acyloxy group, a carbamoyloxy group, an imide group, a sulfinyl group, a phosphoryl group, an acyl group, and an ionic hydrophilic group. Further, preferably at least two of $Z_1$, $Z_2$, $Z_3$, $Z_4$, and $Z_5$ are substituted with substituents whose sum of the values of $\sigma_p$ is 0.4 or greater.

Furthermore, most preferably $Z_1$, $Z_2$, $Z_3$, $Z_4$, and $Z_5$ are each a hydrogen atom, a halogen atom, a cyano group, a nitro group, an alkoxy group, an amide group, a ureido group, a sulfamoylamino group, an alkoxycarbonylamino group, a sulfonamide group, a sulfonyl group, or an ionic hydrophilic group. Furthermore, most preferably at least two of $Z_1$, $Z_2$, $Z_3$, $Z_4$ and $Z_5$ are substituted with substituents whose sum of the values of $\sigma_p$ is 0.4 or greater.

$Z_6$ and $Z_9$ each independently represents —$NR_7$—, an oxygen atom, or a sulfur atom, where $R_7$ represents a hydrogen atom or a substituent.

Examples of the substituent $R_7$ are the same as $R_3$ to $R_6$ in the general formula (I) and preferred examples of the substituent $R_7$ are also the same as those of $R_3$ to $R_6$.

$Z_7$, $Z_8$, $Z_{10}$, $Z_{11}$, $Z_{12}$, $Z_{13}$, $Z_{14}$, $Z_{15}$, $Z_{16}$, $Z_{17}$, $Z_{18}$, $Z_{19}$, $Z_{20}$, $Z_{21}$, $Z_{22}$, $Z_{23}$, $Z_{24}$, $Z_{25}$, and $Z_{26}$ are defined in the same way, respectively, as $R_3$, $R_4$, $R_5$, and $R_6$ in the general formula (II).

Preferably, $Z_7$, $Z_8$, $Z_{10}$, $Z_{11}$, $Z12$, $Z_{13}$, $Z_{14}$, $Z_{15}$ $Z_{16}$, $Z_{17}$, $Z_{18}$, $Z_{19}$, $Z_{20}$, $Z_{21}$, $Z_{22}$, $Z_{23}$, $Z_{24}$, $Z_{25}$, and $Z_{26}$ are each a hydrogen atom, a halogen atom, an alkyl group, a cyano group, a nitro group, an alkoxy group, an amide group, a ureido group, a sulfamoylamino group, an alkoxycarbonylamino group, a sulfonamide group, a carbamoyl group, a sulfamoyl group, a sulfonyl group, an alkoxycarbonyl group, an acyloxy group, a carbamoyloxy group, an imide group, a sulfinyl group, a phosphoryl group, an acyl group, or an ionic hydrophilic group.

More preferably, $Z_7$, $Z_8$, $Z_{10}$, $Z_{11}$, $Z_{12}$, $Z_{13}$, $Z_{14}$, $Z_{15}$, $Z_{16}$, $Z_{17}$, $Z_{18}$, $Z_{19}$, $Z_{20}$, $Z_{21}$, $Z_{22}$, $Z_{23}$, $Z_{24}$, $Z_{25}$, and $Z_{26}$ are each a hydrogen atom, a halogen atom, a cyano group, a nitro group, an alkoxy group, an amide group, a ureido group, a sulfamoylamino group, an alkoxycarbonylamino group, a sulfonamide group, a sulfonyl group, or an ionic hydrophilic group.

Among the azo compounds represented by the general formula (II), the azo compounds having the structures represented by the general formulae (VI) are preferable.

General Formulae (VI)

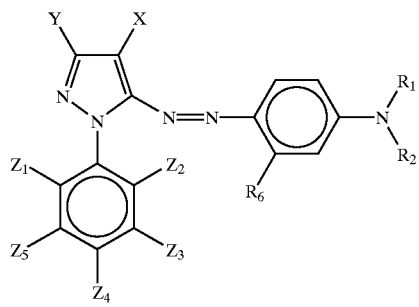
(VI-1)

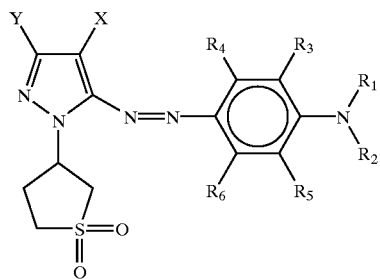
(VI-2)

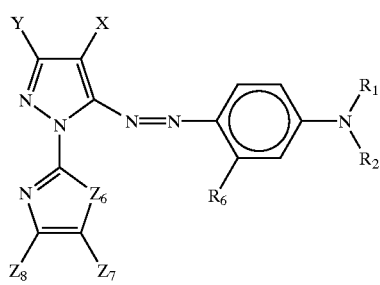
(VI-3)

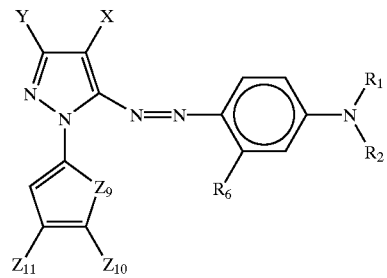
(VI-4)

-continued

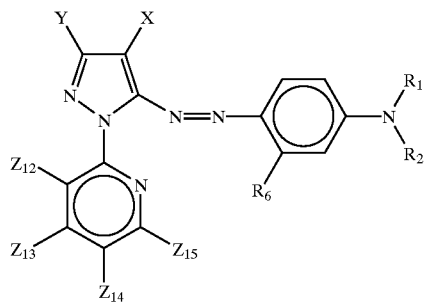
(VI-5)

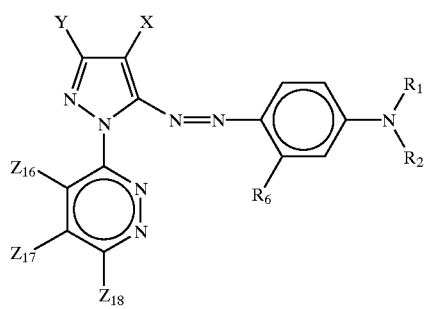
(VI-6)

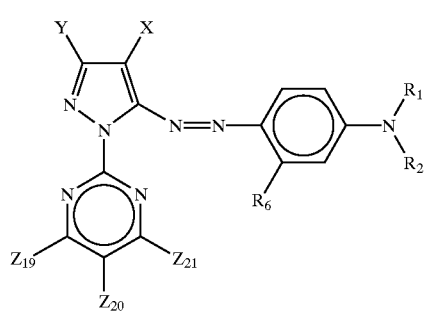
(VI-7)

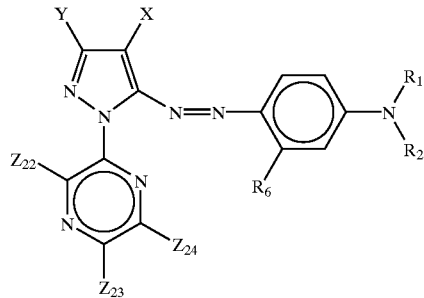
(VI-8)

-continued (VI-9)

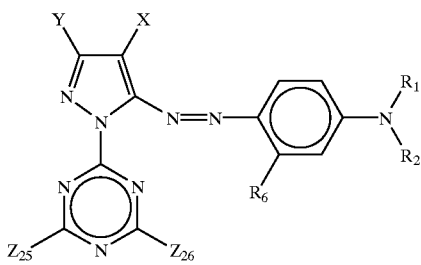

In the azo dyes represented by the general formula (I), particularly preferable combinations of the substituents are as follows. X is a cyano group, an alkylsulfonyl group having 1 to 12 carbon atoms, or an arylsulfonyl group having 6 to 18 carbon atoms, and is particularly preferably a cyano group. Y is a secondary or tertiary alkyl, an aryl group, or a heterocyclic group and is particularly preferably a t-butyl group. $R_1$ is an aryl group or a heterocyclic group (which may have an ionic hydrophilic group as a substituent) and is particularly preferably an aryl group. $R_2$ is an alkyl group or an aryl group (which may have an ionic hydrophilic group as a substituent) and is particularly preferably an aryl group. $R_6$ is an amide group, a ureido group, a sulfamoylamino group, an alkoxycarbonylamino group, or a sulfonamide group, more preferably an amide group, a ureido group, or a sulfonamide group, and is particularly preferably an amide group (which may have an ionic hydrophilic group as a substituent). $Z_1$ and $Z_2$ are each a halogen atom or an alkyl group. $Z_4$ is a hydrogen atom, a halogen atom, an amide group, a sulfonamide group, a carbamoyl group, a sulfamoyl group, an alkoxycarbonyl group, or an ionic hydrophilic group, and is particularly preferably an ionic hydrophilic group or an amide group.

The preferable combinations of the substituents of the compound represented by the general formula (II) are as follows. A compound in which at least one of the substituents is the preferable group described above is preferable; a compound in which more of the substituents are the preferable groups described above is more preferable; and a compound in which all of the substituents are the preferable groups described above is most preferable.

A detailed description of the pyrazolylaniline azo dye derivative represented by the general formula (IV) of the present invention is given below. The compound represented by the general formula (IV) is a compound having a novel structure hitherto unknown. This compound is useful as a water-soluble dye for ink jet printing ink or as an intermediate for synthesis of the water-soluble dye and can be an intermediate for useful chemical, medical, or agricultural organic chemical compounds.

General Formula (IV)

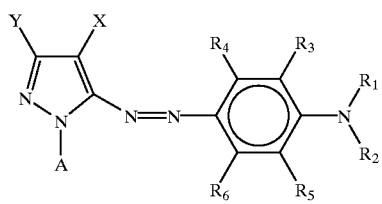

In the general formula (IV), X, Y, A, $R_1$, $R_2$, $R_3$, $R_4$, $R_5$, and $R_6$ are defined in the same way as X, Y, A, $R_1$, $R_2$, $R_3$, $R_4$, $R_5$, and $R_6$ in the general formula (II), respectively. The same applies to the preferred examples of X, Y, A, $R_1$, $R_2$, $R_3$, $R_4$, $R_5$, and $R_6$.

Among the azo compounds represented by the general formula (IV), the azo compounds having the structures represented by the general formulae (VII) are more preferable.

General Formulae (VII)

(VII-1)

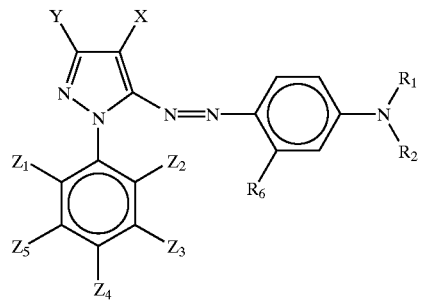

(VII-2)

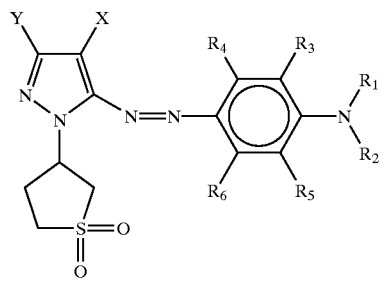

(VII-3)

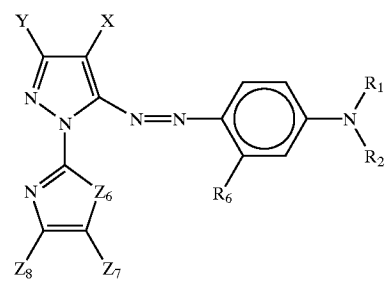

(VII-4)

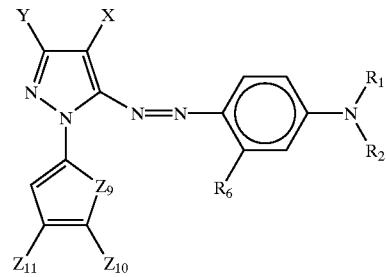

-continued (VII-5)

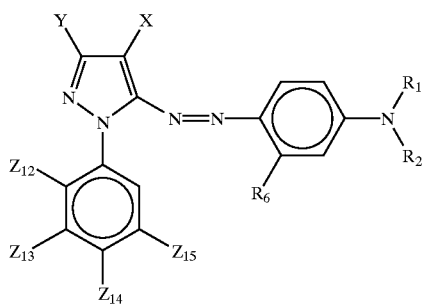

(VII-6)

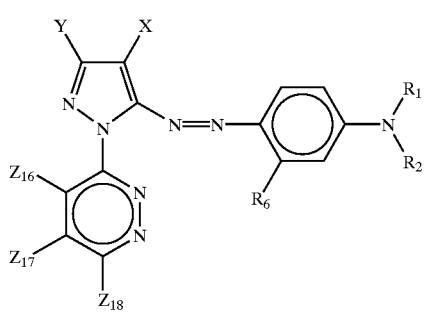

(VII-7)

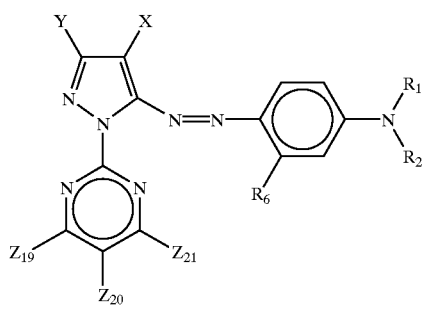

(VII-8)

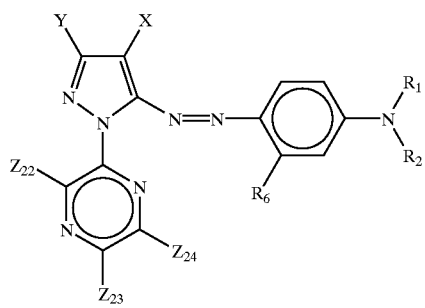

-continued (VII-9)

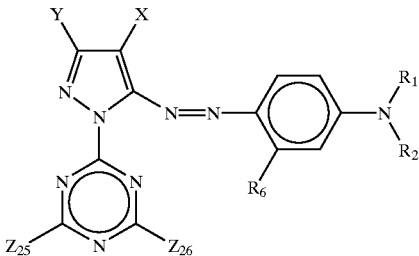

In the general formula (VII), X, Y, $R_1$, $R_2$, $R_3$, $R_4$, $R_5$, $R_6$, $Z_1$, $Z_2$, $Z_3$, $Z_4$, $Z_5$, $Z_6$, $Z_7$, $Z_8$, $Z_9$, $Z_{10}$, $Z_{11}$, $Z_{12}$, $Z_{13}$, $Z_{14}$, $Z_{15}$, $Z_{16}$, $Z_{17}$, $Z_{18}$, $Z_{19}$, $Z_{20}$, $Z_{21}$, $Z_{22}$, $Z_{23}$, $Z_{24}$, $Z_{25}$, and $Z_{26}$ are defined in the same way as X, Y, $R_1$, $R_2$, $R_3$, $R_4$, $R_5$, $R_6$, $Z_1$, $Z_2$, $Z_3$, $Z_4$, $Z_5$, $Z_6$, $Z_7$, $Z_8$, $Z_9$, $Z_{10}$, $Z_{11}$, $Z_{12}$, $Z_{13}$, $Z_{14}$, $Z_{15}$, $Z_{16}$, $Z_{17}$, $Z_{18}$, $Z_{19}$, $Z_{20}$, $Z_{21}$, $Z_{22}$, $Z_{23}$, $Z_{24}$, $Z_{25}$, and $Z_{26}$ in the general formula (VI). The same applies to the preferred examples thereof.

The preferable combinations of the substituents of the compound represented by the general formula (VII) are as follows. The compound in which at least one of the substituents is the preferable group described above is preferable; the compound in which more of the substituents are the preferable groups described above is more preferable; and compound in which all of the substituents are the preferable groups described above is most preferable.

Specific examples (exemplary compounds 101 to 130) of the azo dyes represented by the general formulae (I), (II), and (IV) are given below. However, it should be noted that the azo dyes that can be used in the present invention are not limited to these examples.

(101)

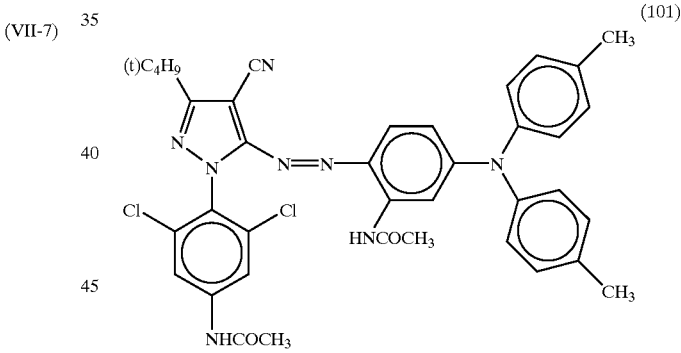

(102)

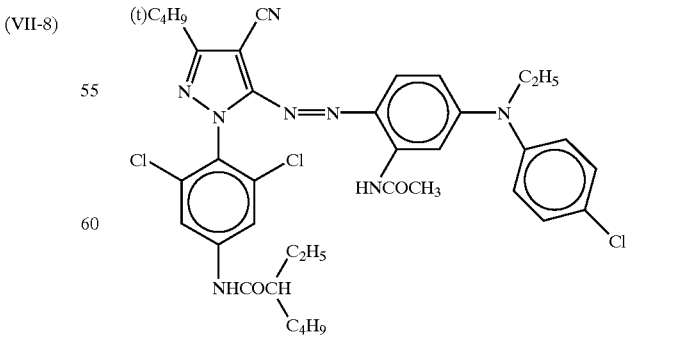

-continued
(103)
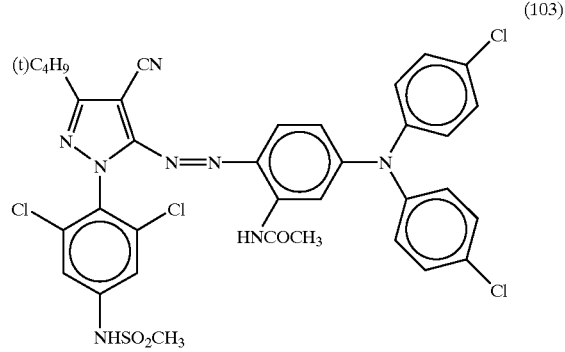
(104)
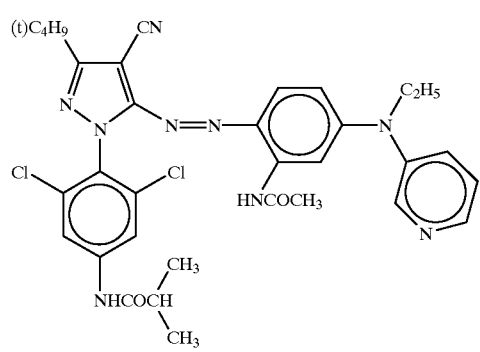
(105)
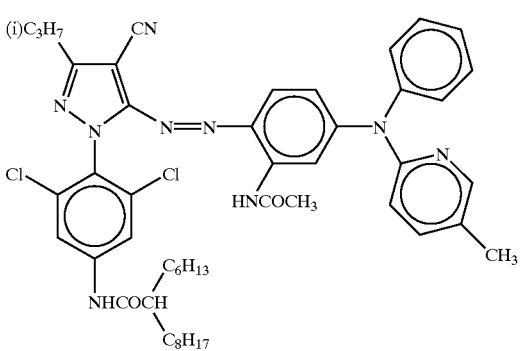
(106)
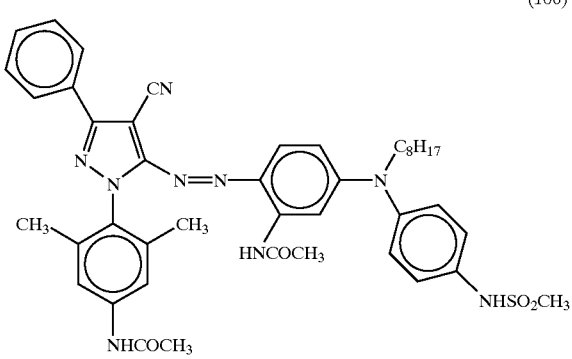
-continued
(107)
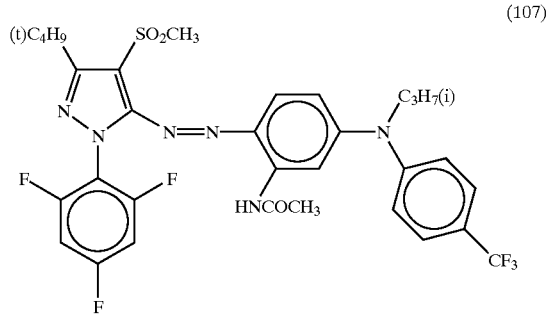
(108)
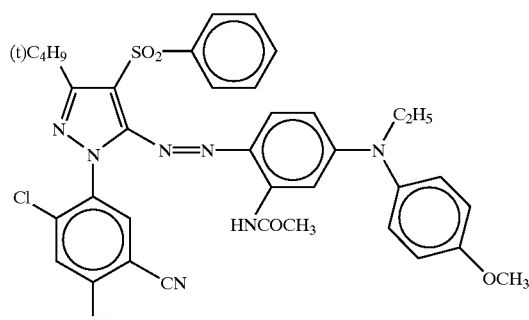
(109)
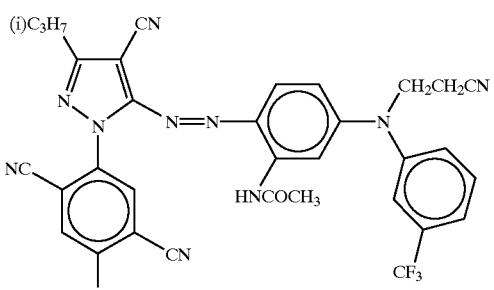
(110)
(111)
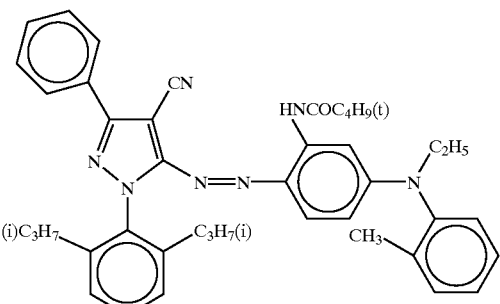

-continued
(112)
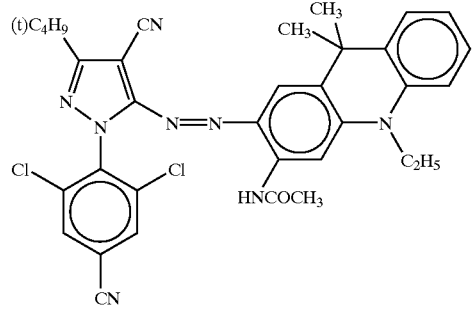
(113)
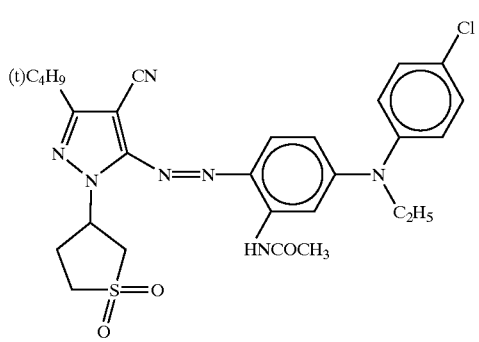
(114)
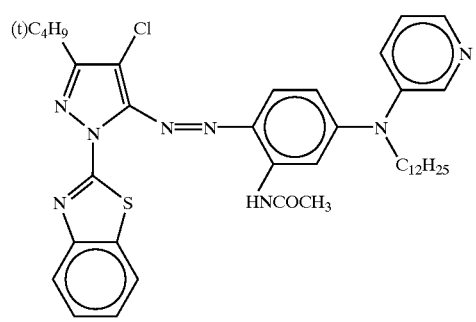
(115)
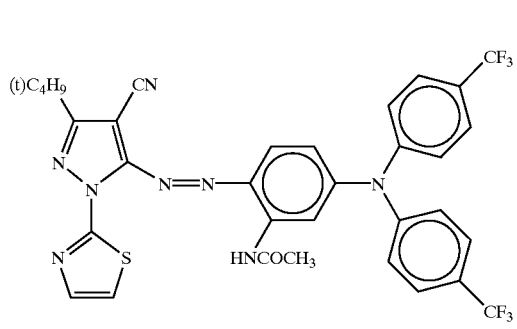
-continued
(116)
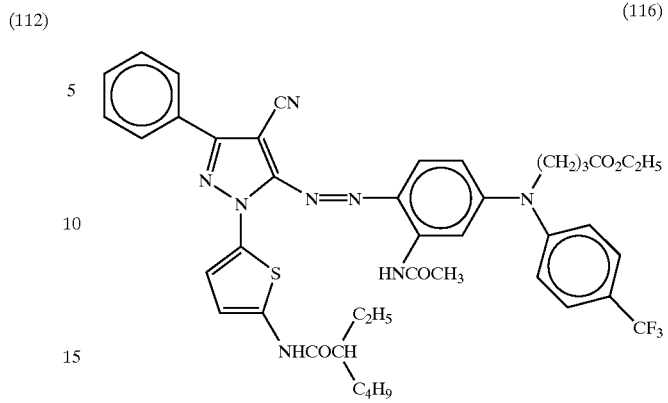
(117)
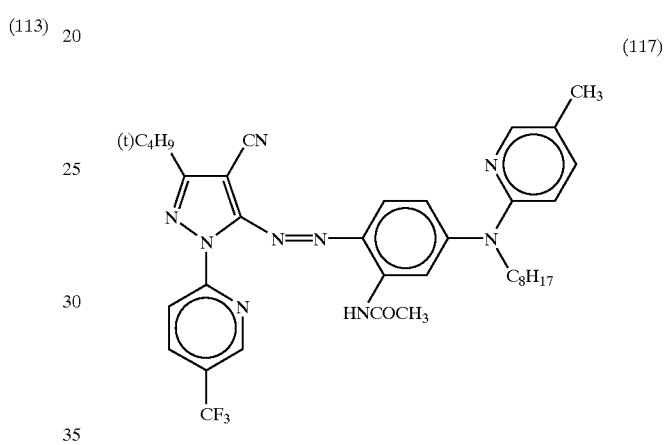
(118)
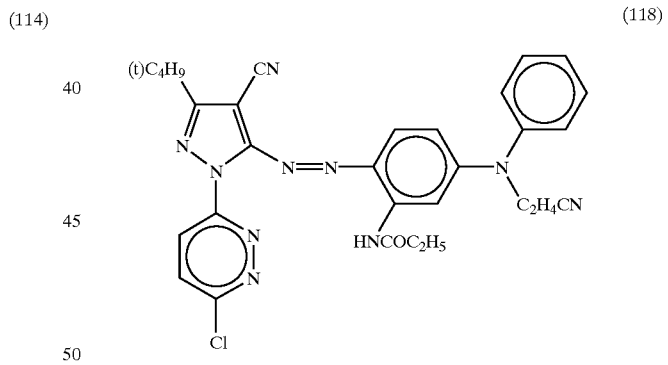
(119)
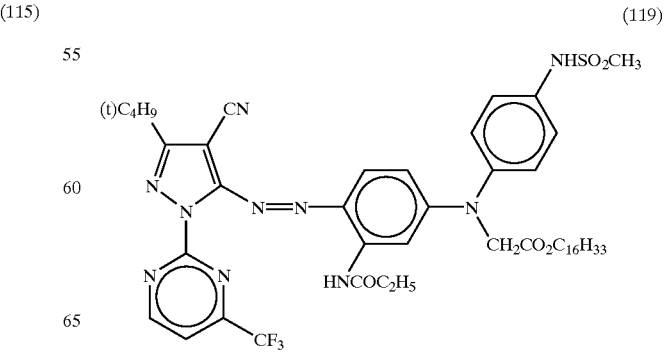

(120)
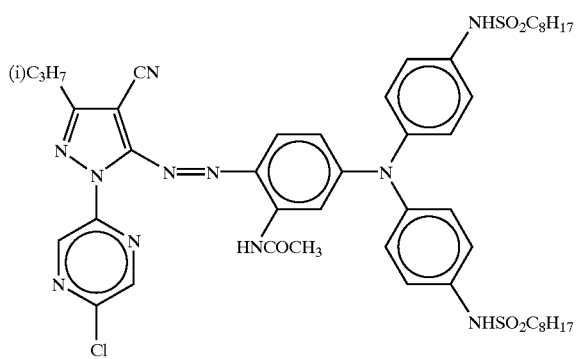
(121)
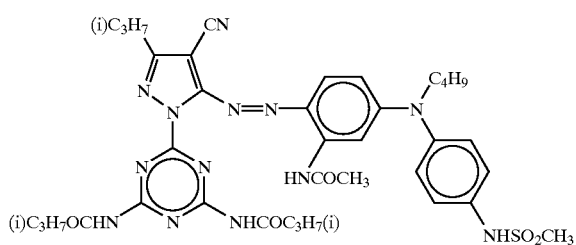
(122)
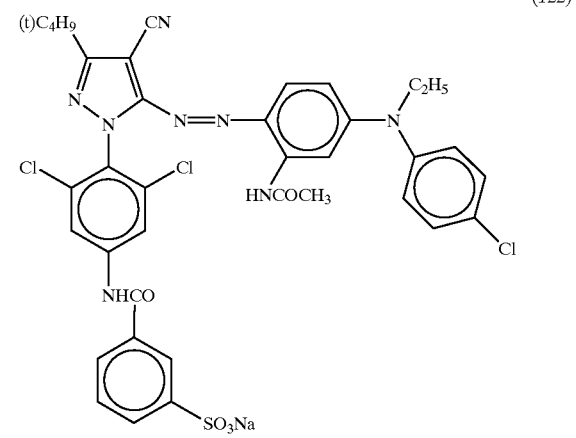
(123)
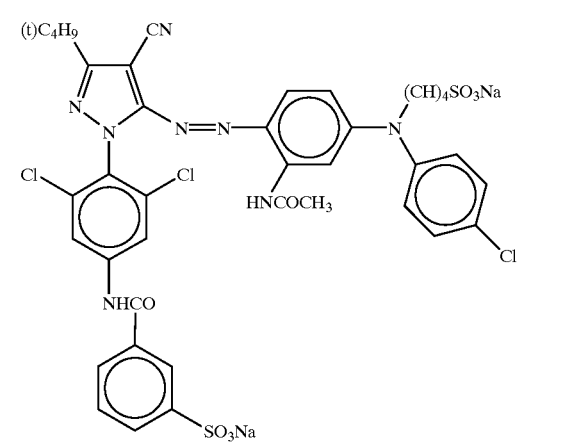
(124)
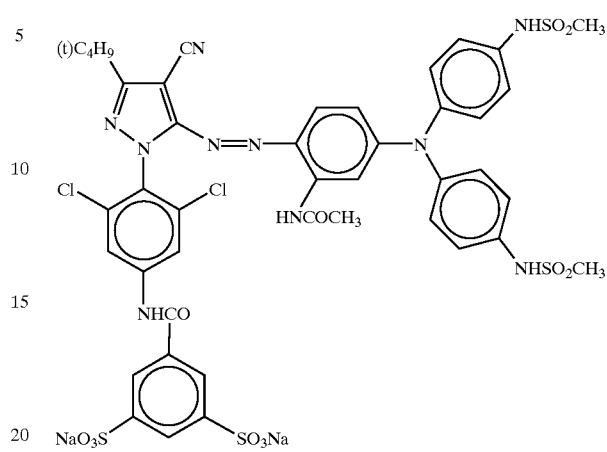
(125)
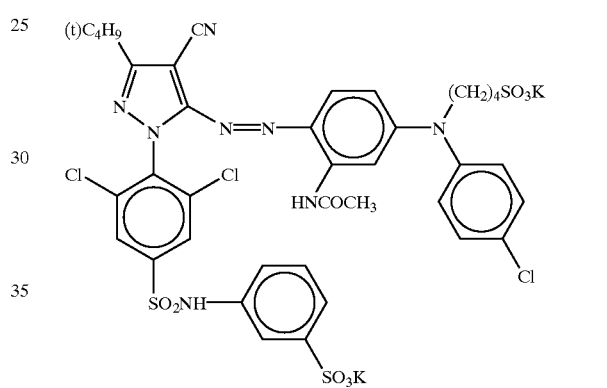
(126)
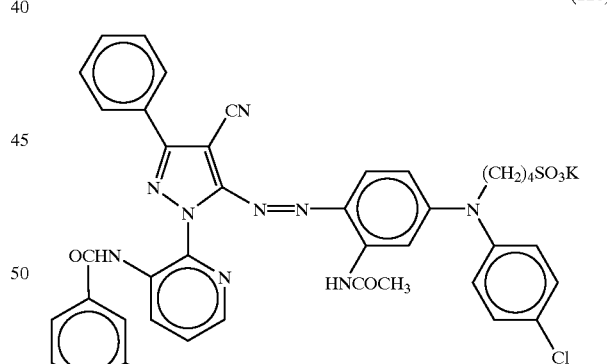
(127)
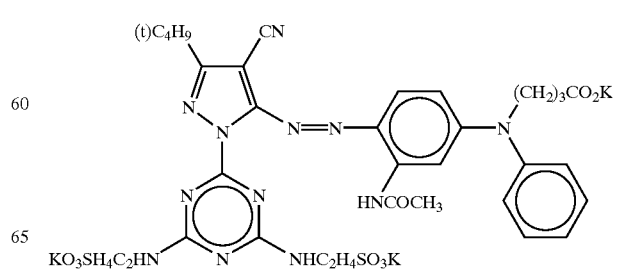

-continued

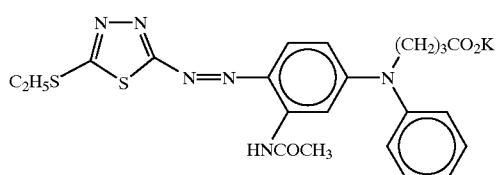
(128)

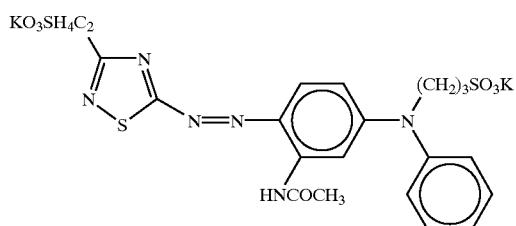
(129)

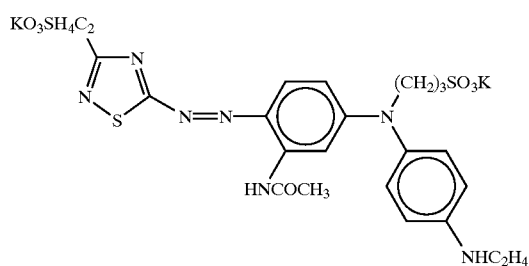
(130)

Specific synthesis examples of the heterylaniline azo dye derivatives of the present invention are given below.

The azo dyes represented by the general formula (I), (II), or (IV) can be synthesized by a diazo coupling reaction between a coupling component, i.e., an aniline derivative represented by the following general formula (i) and a diazo component, i.e., a heterocyclic amine derivative (e.g., 5-amino-pyrazole) represented by the following general formula (ii). Typical examples of the synthetic routes for making the azo dyes (azo dye (I) and (II)) represented by the general formula (I), (II), or (IV) are shown below.

Synthetic Examples of Azo Dyes of the Present Invention

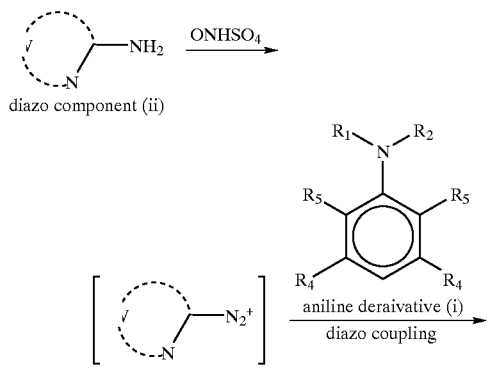

-continued

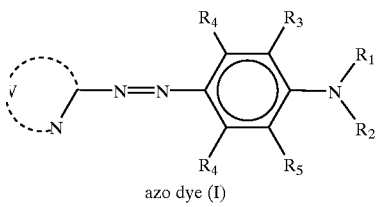
azo dye (I)

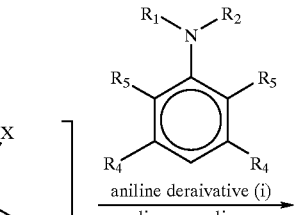

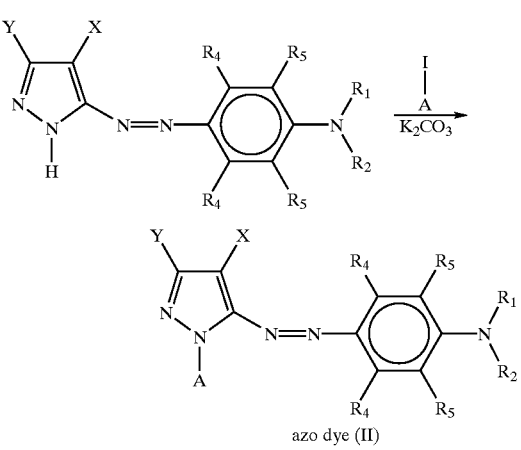
azo dye (II)

The diazo component, i.e., {e.g., 3-(secondary or tertiary alkyl)-4-cyano-5-aminopyrazole or 3-aryl-4-cyano-5-aminopyrazole} as a starting material for use in the present invention, can be synthesized by making reference to the methods described in U. S. Pat. No. 3,336,285, Heterocycles, 20, 519(1983), and Japanese Patent Application Publication (JP-B) No. 6-19036. Typical examples are given below.

Synthetic Example of the Dizao Comonent of an Azo Dye of the Present Invention

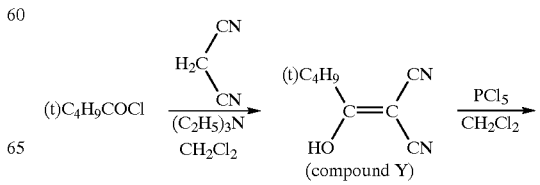
(compound Y)

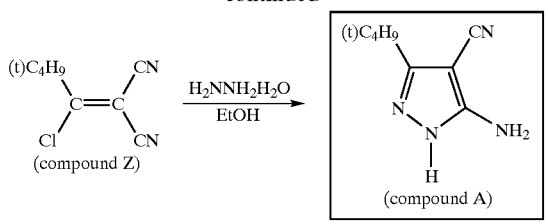

The aniline coupler component as a starting material for use in the present invention can be synthesized by making reference, for example, to the method described in Tetrahedron Letter Vol. 37, No.51, pp.9207–9210 (1996). Typical examples are given below.

an ester-based solvent, and an ether-based solvent are preferable. Mixtures of these solvents with alcoholic solvents or water are also preferable. The most preferred solvent is a single organic solvent, i.e., an aliphatic acid-based solvent or an ester-based solvent, a mixture of such solvent with water, or water as a single solvent.

Examples of the acid that can be used include hydrochloric acid, nitric acid, sulfuric acid, methanesulfonic acid, trifluoromethanesulfonic acid, heptadecafluorooctanesulfonic acid, acetic acid, trifluoroacetic acid, propionic acid, and a mixture of these acids. Among these acids, sulfuric acid, trifluoromethanesulfonic acid, and heptadecafluorooctanesulfonic acid are preferable. Sulfuric acid and heptadecafluorooctanesulfonic acid are most preferable.

Examples of the diazotizing agent that can be used include, sodium nitrite, an aqueous sodium nitrite solution, Synthetic Examples of the Coupler Component of an Azo Dye of the Present Invention

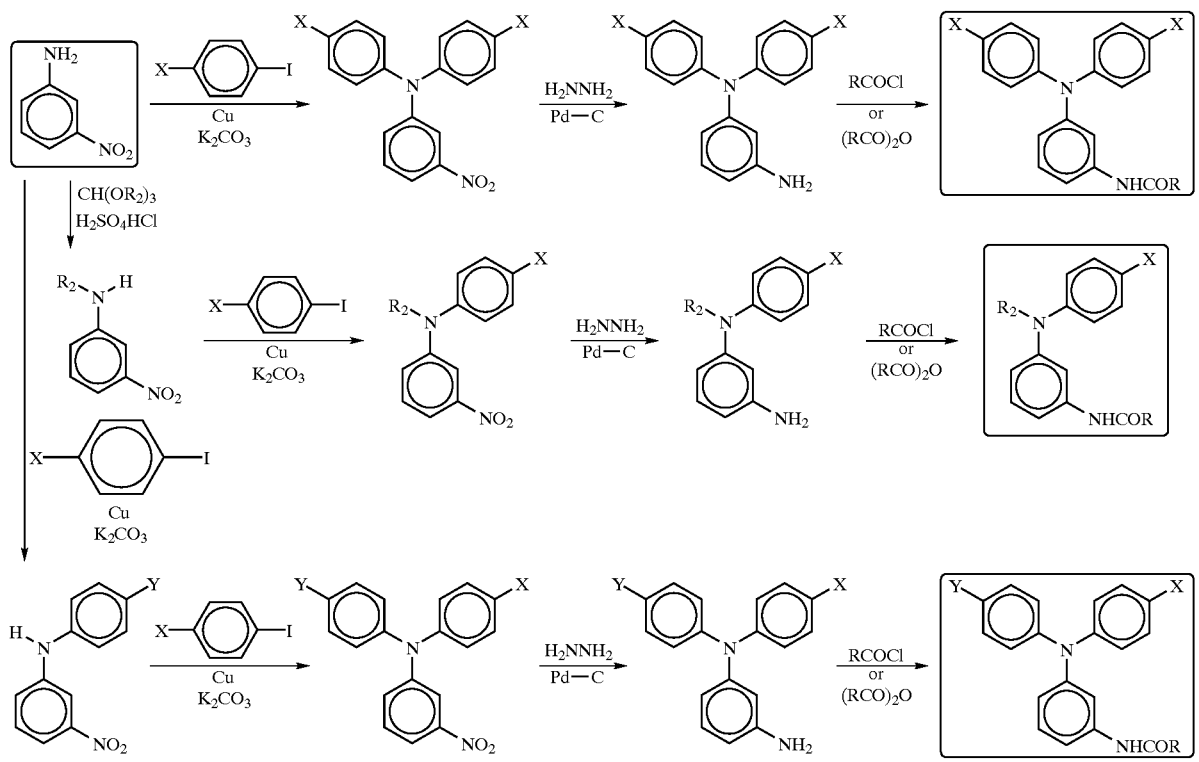

In the preparation of the diazonium salt of the heterocyclic amine derivative (5-amino-pyrazole or the like), an organic solvent (e.g., an aliphatic acid-based solvent such as acetic acid, propionic acid, and isobutyric acid, an alcoholic solvent such as methanol, ethanol, and isopropyl alcohol, an amide-based solvent such as N,N-dimethylacetamide, N,N-dimethylformamide, and 1-methyl-2-pyrrolidone, a sulfone-based solvent such as sulfolane, a sulfoxide-based solvent such as dimethyl sulfoxide, a ureido-based solvent such as tetramethylurea, a halide-based solvent such as dichloromethane, chloroform, and 1,2-dichloroethane, an ester-based solvent such as ethyl acetate and butyl acetate, and an ether-based solvent such as diethyl ether and tetrahydrofuran) can be used as a reaction solvent. These organic solvents can be used singly or as a mixture of two or more. Further, a mixture of an organic solvent and water can be used. Furthermore, water as a single solvent can be used. Among these solvents, an aliphatic acid-based solvent, potassium nitrite, an aqueous potassium nitrite solution, isoamyl nitrite, and nitrosyl sulfate (a sulfuric acid solution). Among these diazotizing agents, an aqueous sodium nitrite solution, isoamyl nitrite, and nitrosyl sulfate (a sulfuric acid solution) are preferable. The most preferred diazotizing agents are isoamyl nitrite and nitrosyl sulfate (a sulfuric acid solution).

The diazotization reaction temperature is within the range of −78 to 50° C., preferably within the range of −20 to 20° C., and particularly preferably within the range of −20 to 10° C.

Examples of the solvent that can be used as a reaction solvent in the diazo coupling reaction (i.e., conversion into an azo dye) include an organic solvent (e.g., an aliphatic acid-based solvent such as acetic acid, propionic acid, and isobutyric acid, an alcoholic solvent such as methanol, ethanol, and isopropyl alcohol, an amide-based solvent such as N,N-dimethylacetamide, N,N-dimethylformamide, and 1-methyl-2-pyrrolidone, sulfone-based solvent such as sulfolane, a sulfoxide-based solvent such as dimethyl sulfoxide, a ureido-based solvent such as tetramethylurea, a halide-based solvent such as dichloromethane, chloroform, and 1,2-dichloroethane, an ester-based solvent such as ethyl acetate and butyl acetate, an ether-based solvent such as diethyl ether and tetrahydrofuran, and a pyridine-based solvent such as pyridine, α-picoline, and 2,6-lutidine). These organic solvents can be used singly or as a mixture of two or more. Further, a mixture of an organic solvent and water can be used. Furthermore, water as a single solvent can be used. Among these solvents, an aliphatic acid-based solvent, an amide-based solvent, an ester-based solvent, and an ether-based solvent are preferable. Mixtures of these solvents with alcoholic solvents or water are also preferable. In particular, an aliphatic acid-based solvent or an amide-based solvent as a single solvent and a mixture of such solvent with an alcoholic solvent or water are preferable.

Examples of the base that can be used include an organic base (e.g., an aliphatic amine such as a triethylamine aqueous solution, triethylamine, tripropylamine, diisopropylethylamine, triethanolamine, and diethanolamine, an aromatic amine such as N, N-dimethylaniline and N,N-diethylaniline, and a nitrogen-containing unsaturated heterocycle such as pyridine, α-picoline, 2,6-lutidine, pyridazine, and N-imidazole) and an inorganic base (e.g., an acetate such as potassium acetate and sodium acetate, a carbonate such as potassium carbonate, sodium carbonate, sodium hydrogencarbonate, and potassium hydrogencarbonate, and a metal hydroxide such as sodium hydroxide and potassium hydroxide). Among these bases, aliphatic amines, nitrogen-containing unsaturated heterocycles, and acetates are preferable. In particular, aliphatic amines and acetates are preferable.

The reaction temperature for the diazo coupling reaction (i.e., conversion into an azo dye) is within the range of −78 to 50° C., preferably within the range of −20 to 20° C., and particularly preferably within the range of −20 to 15° C.

The product obtained by any of these reactions is post-treated according to an ordinary method employed in organic synthesis and is used after being purified or without being purified. That is, the reaction product liberated from the reaction system can be used without purification. Otherwise, the reaction product liberated from the reaction system may be subjected to a process or a combination of processes which include recrystallization, column chromatography, or the like. Alternatively, after the completion of the reaction, the reaction product, after removal of the reaction solvent by distillation or without the reaction solvent being removed by distillation, is poured into water or onto ice. After that, the separated product, after being neutralized or without being neutralized, may be subjected to a process or a combination of processes which include recrystallization, column chromatography, or the like. Further, after the completion of the reaction, the reaction product, after removal of the reaction solvent by distillation or without the reaction solvent being removed by distillation, is poured into water or onto ice. After that, the resulting mixture, after being neutralized or without being neutralized, may be extracted with an organic solvent. The extract may be used without being purified, or the extract may be subjected to a process or a combination of processes which include crystallization, column chromatography, or the like.

Typical azo dye derivatives of the present invention can be easily synthesized by making reference to the following synthetic schemes.

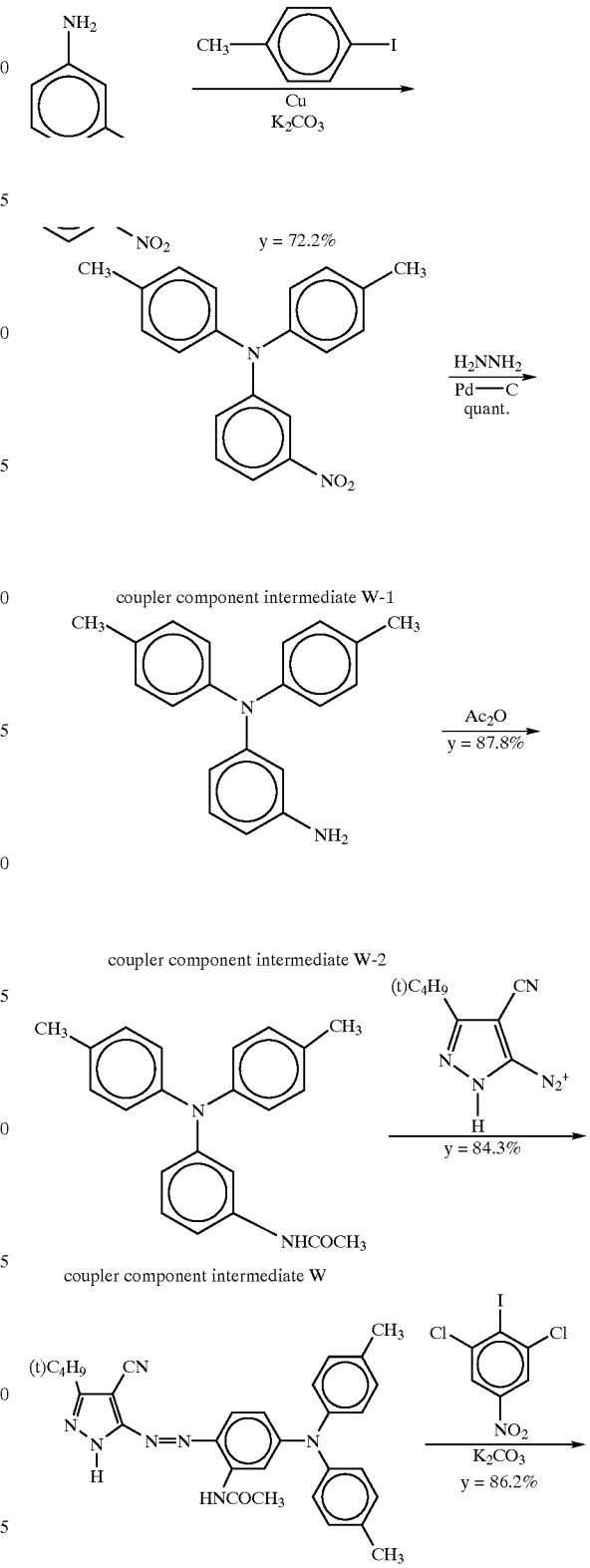

Synthetic Route of a Specific Compound 101

-continued

Dye 101-A

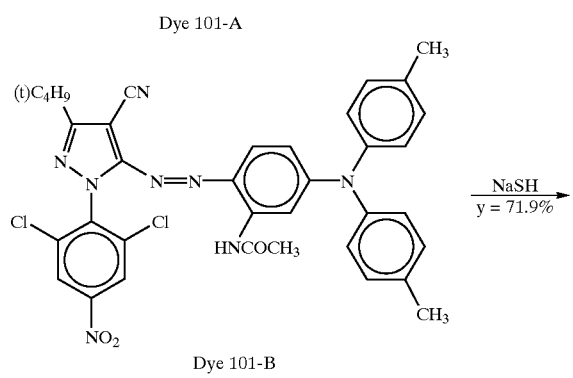

$\xrightarrow{\text{NaSH}}$ y = 71.9%

Dye 101-B

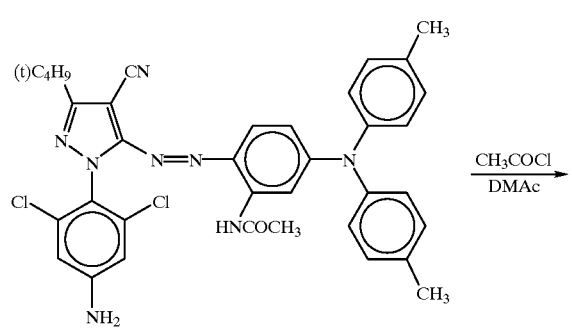

$\xrightarrow[\text{DMAc}]{\text{CH}_3\text{COCl}}$

Dye 101-C

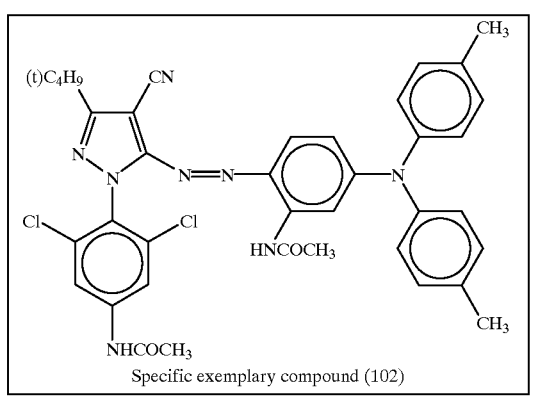

Specific exemplary compound (102)

Synthetic Route of a Specific Compound 102

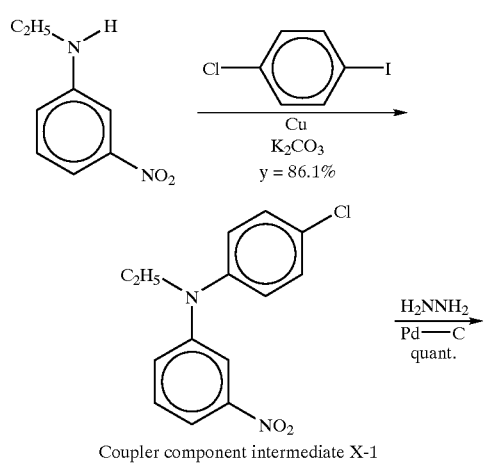

Coupler component intermediate X-1

-continued

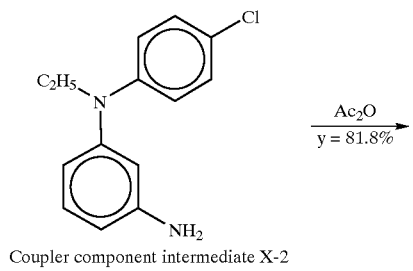

Coupler component intermediate X-2

$\xrightarrow{\text{Ac}_2\text{O}}$ y = 81.8%

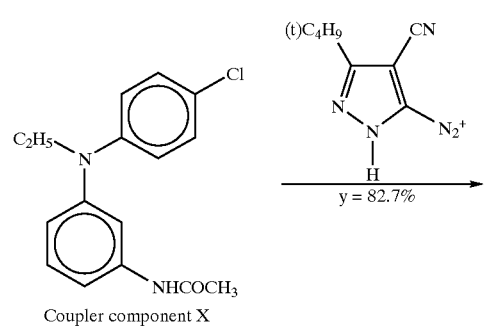

Coupler component X y = 82.7%

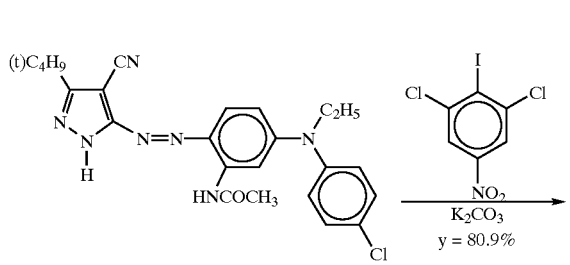

$\xrightarrow[\text{y = 80.9\%}]{\substack{\text{K}_2\text{CO}_3}}$

Dye 102-A

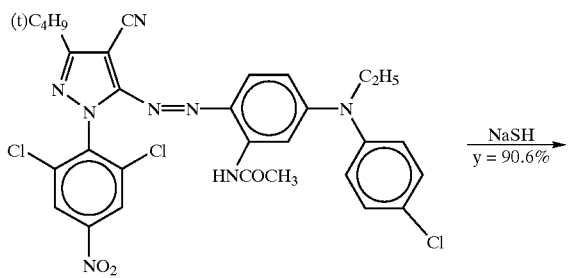

$\xrightarrow{\text{NaSH}}$ y = 90.6%

Dye 102-B

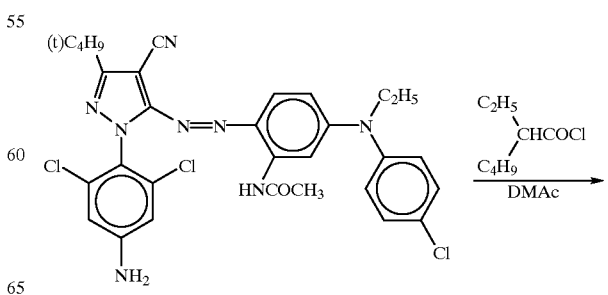

$\xrightarrow[\text{DMAc}]{\substack{\text{C}_2\text{H}_5 \\ \text{CHCOCl} \\ \text{C}_4\text{H}_9}}$ Dye 102-C

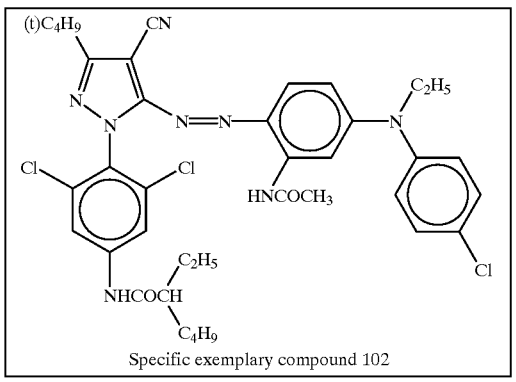

Specific exemplary compound 102

That is, according to the synthetic routes, a heterocyclic amine derivative, a diazo component compound (A) and an aniline derivative as a coupler component or compound (W) or (X) were synthesized as the intermediates of synthesis of the exemplary compounds. The intermediates were subjected to the diazo coupling reaction for making dyes and to a subsequent reaction (such as a nucleophilic substitution reaction, Michael addition reaction and the like). In this way, the exemplary compounds (101) and (102) were obtained.

Synthesis Example 1
(Synthesis of the Specific Exemplary Compound (101))
Synthesis of the Compound (A)
(a) Synthesis of an Intermediate Compound (Y) of the Diazo Component Pivaloyl chloride (60 g) and malononitrile (33 g) were dissolved in methylene chloride (500 mL), and the solution was placed in a flask equipped with a stirrer and a dropping funnel. While the internal temperature was kept at 5° C. or below, triethylamine (100 g) was gradually added to the solution in the flask over a period of 60 minutes. After that, while the resulting reaction solution was gradually heated, the reaction solution was stirred until the solution interior reached room temperature. Next, after the triethylamine hydrochloride that was formed was removed, the filtrate was concentrated until methylene chloride disappeared. The concentrated liquid was poured onto ice and the liquid was strongly acidified with concentrated sulfuric acid. The deposited crystals were collected by filtration and were then washed sufficiently with water. After that, the crystals were dried overnight at 50° C. The amount of the reaction product obtained was 51.2 g and the yield was 68.4%.

(b) Synthesis of an Intermediate Compound (Z) of the Diazo Component

The pivaloyl malononitrile intermediate (Y) (51 g) thus obtained was placed in methylene chloride (500 mL) and mildly stirred so that a suspension was formed. To the suspension was added phosphorus pentachloride (78 g) gradually. The reaction solution was continuously stirred for 16 hours at room temperature. Sulfur dioxide was introduced into the solution for 20 minutes and the solvent was distilled off under a reduced pressure by means of a rotary evaporator. The residue was poured onto ice and the deposited crystals were collected by filtration. The reaction product thus obtained was not subjected to further purification.

(c) Synthesis of the Diazo Component Compound (A)

Hydrazine monohydrate (15 g) was dissolved in ethanol (50 mL), and the solution was placed in a flask equipped with a condenser, a dropping funnel, a thermometer, and a magnetic stirrer. While the solution was stirred, an ethanol solution (200 mL) of the intermediate (Z) (51 g) that was obtained above was added to the solution in the flask at such a rate that did not allow the temperature of the solution in the flask to become higher than 35° C. After that, the reaction mixture was refluxed mildly for 90 minutes and part of the solvent was removed. The residue was treated with water. The reaction product was then dried overnight at 50° C. The 44 g of crude crystals thus obtained were purified by recrystallization using a 2/1 mixture of ethyl acetate/n-hexane. The amount of the reaction product obtained was 35.3 g and the yield was 71.7%.

Synthesis of the Coupler Component Compound (W)
(d) Synthesis of an Intermediate (W-1) of the Coupler Component m-nitroaniline (13.8 g) was suspended in o-dichlorobenzene (200 mL) and mildly stirred. To the suspension were gradually added potassium carbonate (36.4 g) and copper powder (2 g) while being stirred. Further, p-methyliodobenzene (98.12 g) was added. The reaction liquid was then gradually heated to reflux temperature. After that, reaction liquid was continuously stirred for 12 hours at the reflux temperature. Next, after the reaction liquid was cooled to room temperature, the reaction liquid underwent Celite filtration (i.e., removal of inorganic substance). The filtrate was subjected to distillation under a reduced pressure to remove the solvent. The residue (oily substance) was purified by means of silica gel column chromatography ($CH_2Cl_2$/n-hexane). After that, the crude product was purified by recrystallization from $CH_2Cl_2$/$CH_3OH$. In this way, the coupler component compound (W-1) was obtained. The amount of the product was 23 g and the yield was 72.2%.

(e) Synthesis of an Intermediate (W-2) of the Coupler Component

The intermediate (W-1) obtained above (16 g) was suspended in ethanol (200 mL). To the suspension was added 10% Pd-C (1 g) and the suspension was stirred at room temperature. Next, hydrazine monohydrate (10 mL) was added dropwise over a period of 5 minutes while paying attention to the foaming. After that, the reaction mixture was continuously stirred for 20 minutes at reflux temperature, and, while hot, the reaction mixture underwent Celite filtration. Warm water was added to the filtrate and, while being stirred, the mixture was allowed to cool down to room temperature. The aqueous solution was removed by decantation from the deposited solid substance and the solid substance was dissolved in ethyl acetate. The solution underwent drying by $MgSO_4$, filtration, and removal of ethyl acetate by distillation under a reduced pressure using a rotary evaporator. The amount of the product was 14.4 g and the yield was 100%.

(f) Synthesis of Coupler Component (W)

The intermediate (W-2) obtained above (14.4 g) was dissolved in acetonitrile (100 mL). To the solution was added acetic anhydride (5.7 mL) dropwise. The reaction mixture was stirred for 15 minutes at reflux temperature. Next, the acetonitrile was removed by distillation under a reduced pressure using a rotary evaporator. To the oily substance obtained was added n-hexane that had been warmed in advance and the resulting solution was stirred while hot. While being stirred, the solution was allowed to cool down gradually to room temperature. After that, the deposited crystals were collected by filtration and dried overnight at room temperature. The amount of the product was 14.5 g and the yield was 87.8%.

(g) Synthesis of Dye (101-A)

A reaction liquid composed of the diazo component A obtained above (3.3 g), concentrated hydrochloric acid (6 mL), and water (20 mL) was stirred at an internal temperature of 5° C. To the reaction liquid was added sodium nitrite (1.5 g) in aliquots over a period of 5 minutes. The reaction liquid was continuously stirred for 15 minutes to thereby prepare a diazonium salt. Next, the diazonium salt prepared above was dropped over a period of 10 minutes into a 3-neck flask which had been charged with the coupler component (W) (6.6 g), sodium acetate (20 g), acetic acid (100 mL), and propionic acid (50 mL) and had been cooled so that the internal temperature was kept at 5° C. After the addition of the diazonium salt, the reaction liquid was continuously stirred for 30 minutes. After that, ethyl acetate and water were introduced into the reaction liquid for separatory extraction. The ethyl acetate layer was washed with a saturated sodium chloride aqueous solution and thereafter dried by $MgSO_4$. The ethyl acetate was removed by distillation under a reduced pressure using a rotary evaporator. The crude product was purified by recrystallization from $CH_2Cl_2$/methanol. The dye (101-A) that was deposited was isolated by suction filtration. The amount of the product was 8.58 g and the yield was 84.8%.

(h) Synthesis of Dye (101-B)

The dye (101-A) (5.1 g) was dissolved in DMAc (50 mL) at room temperature. To the solution was added potassium carbonate (2.1 g) and then 3,5-dichloro-4-nitrobenzene (4.1 g). The reaction liquid was stirred for 2 hours at 100° C. The reaction liquid was cooled to room temperature. After that, the reaction liquid was poured into water while being stirred. The deposited dye (101-B) was isolated by suction filtration. The crude crystals were purified by recrystallization from $CH_2Cl_2$/methanol. In this way, the dye (101-B) was obtained. The amount of the product was 6.0 g and the yield was 86.2%.

(i) Synthesis of Dye (101-C)

Sodium hydrosulfide (0.56 g) was added to a mixture that was composed of the dye (101-B) (2.8 g), ethanol (100 mL), and water (15 mL) and was being stirred at room temperature. The resulting reaction mixture was heated at reflux temperature for 30 minutes. Upon completion of the reaction, the deposited crystals were collected by filtration. Next, ethyl acetate and a 1 mol/L hydrochloric acid aqueous solution were added to the crude crystals obtained above for separatory extraction. The ethyl acetate layer was washed with a saturated sodium chloride aqueous solution and thereafter dried by $MgSO_4$. After suction filtration, the ethyl acetate was removed by distillation under a reduced pressure using a rotary evaporator. In this way, the dye (101-C) was obtained. The amount of the product was 1.92 g and the yield was 71.9%.

(j) Specific Exemplary Compound: Synthesis of Dye 101

Acetyl chloride (0.21 mL) was gradually added dropwise to a solution that was composed of the dye (101-C) (1.3 g) dissolved in DMAc (15 mL) and was being stirred at an internal temperature of 5° C. The resulting reaction liquid was continuously stirred for 30 minutes. After that, ethyl acetate and a dilute hydrochloric acid aqueous solution were added to the reaction liquid for separatory extraction. The ethyl acetate layer was washed with a saturated sodium chloride aqueous solution and thereafter dried by $MgSO_4$. After suction filtration, the ethyl acetate was removed by distillation under a reduced pressure using a rotary evaporator. In this way, a crude dye (101) was obtained. The crude dye was purified by silica gel column chromatography ($CH_2Cl_2$/n-hexane). According to the procedure described above, the exemplary compound: dye (101) was obtained. The amount of the product was 1.35 g and the yield was 95.5%. $\lambda_{max}$=548.9 nm; $\epsilon_{max}$=4.80×104 (DMF solution)

Synthesis Example 2

(Synthesis of Specific Exemplary Compound 102)

Synthesis of the Coupler Component Compound (X)

(k) Synthesis of an Intermediate (X-1) of Coupler Component m-nitro-N-ethylaniline (16.6 g) was suspended in o-dichlorobenzene (100 mL) and stirred. To the suspension being stirred were added potassium carbonate (18.0 g) and copper powder (2 g) gradually. Further, p-chloroiodobenzene (47.7 g) was added. The reaction liquid was then gradually heated to reflux temperature. After that, the reaction liquid was continuously stirred for 63 hours at the reflux temperature. Next, after the reaction liquid was cooled to room temperature, the reaction liquid underwent Celite filtration (i.e., removal of inorganic substance). The filtrate was subjected to distillation under a reduced pressure to remove the solvent. The residue (oily substance) was purified by means of silica gel column chromatography (ethyl acetate/n-hexane). In this way, the intermediate (X-1) of coupler component in an oily state was obtained. The amount of the product was 23.5 g and the yield was 85.1%.

(l) Synthesis of an Intermediate (X-2) of Coupler Component

The intermediate (X-1) obtained above (13.8 g) was suspended in ethanol (150 mL). To the suspension was added 10% Pd-C (1 g) and the suspension was stirred at room temperature. Next, hydrazine monohydrate (10 mL) was added dropwise over a period of 5 minutes while paying attention to the foaming. After that, the reaction mixture was continuously stirred for 20 minutes at reflux temperature, and, while hot, the reaction mixture underwent Celite filtration. Warm water was added to the filtrate and, while being stirred, the mixture was allowed to cool down to room temperature. The aqueous solution was removed by decantation from the deposited solid substance and the solid substance was dissolved in ethyl acetate. The solution underwent drying by $MgSO_4$, filtration, and removal of ethyl acetate by distillation under a reduced pressure using a rotary evaporator. The amount of the product was 12.3 g and the yield was 100%.

(m) Synthesis of Coupler Component (X)

The intermediate (X-2) obtained above (12.3 g) was dissolved in acetonitrile (150 mL). To the solution was added acetic anhydride (7.1 mL) dropwise. The reaction mixture was stirred for 60 minutes at reflux temperature. Next, the acetonitrile was removed by distillation under a reduced pressure using a rotary evaporator. To the oily product obtained was added n-hexane that had been warmed in advance and the resulting solution was stirred while hot. While being stirred, the solution was then allowed to cool down gradually to room temperature. After that, the deposited crystals were collected by filtration and dried overnight at room temperature. The amount of the product was 11.8 g and the yield was 81.8%.

(n) Synthesis of Dye (102-A)

A reaction liquid composed of the diazo component A obtained above (4.9 g), concentrated hydrochloric acid (11 mL), and water (40 mL) was stirred at an internal temperature of 5° C. To the reaction liquid was added sodium nitrite (2.2 g) in aliquots over a period of 5 minutes. The reaction liquid was continuously stirred for 15 minutes to thereby prepare a diazonium salt. Next, the diazonium salt prepared above was dropped over a period of 10 minutes into a 3-neck flask which had been charged with the coupler component (X) (9 g), sodium acetate (37 g), acetic acid (100 mL), and propionic acid (50 mL) and had been cooled so that the internal temperature was kept at 5° C. After the addition of the diazonium salt, the reaction liquid was continuously stirred for 30 minutes. After that, ethyl acetate and water were introduced into the reaction liquid for separatory extraction. The ethyl acetate layer was washed with a saturated sodium chloride aqueous solution and thereafter dried by $MgSO_4$. The ethyl acetate was removed by distillation under a reduced pressure using a rotary evaporator. The crude product was purified by recrystallization from warm methanol. The dye (102-A) that was deposited was isolated by suction filtration. The amount of the product was 11.5 g and the yield was 82.7%.

(o) Synthesis of Dye (102-B)

The dye (102-A) (9.3 g) was dissolved in DMAc (100 mL) at room temperature. To the solution was added potassium carbonate (4.1 g) and then 3,5-dichloro-4-nitrobenzene (9.5 g). The reaction liquid was stirred for 2 hours at 100° C. The reaction liquid was cooled to room temperature. After that, the reaction liquid was poured into water while being stirred. Next, ethyl acetate was introduced into the reaction liquid for separatory extraction. The ethyl acetate layer was washed with a saturated sodium chloride aqueous solution and thereafter dried by $MgSO_4$. The ethyl acetate was removed by distillation under a reduced pressure using a rotary evaporator. The crude product was purified by recrystallization from $CH_2Cl_2$/methanol. In this way, the dye (101-B) was obtained. The amount of the product was 10.6 g and the yield was 80.9%.

(p) Synthesis of Dye (102-C)

Sodium hydrosulfide (1.4 g) was added to a mixture that was composed of the dye (102-B) (6.5 g), ethanol (300 mL), and water (50 mL) and was being stirred at room temperature. The resulting reaction mixture was heated at reflux temperature for 30 minutes. Upon completion of the reaction, the ethyl acetate was removed by distillation under a reduced pressure using a rotary evaporator. Next, ethyl acetate and a 1 mol/L hydrochloric acid aqueous solution were added to the distillation residue for separatory extraction. The ethyl acetate layer was washed with a saturated sodium chloride aqueous solution and thereafter dried by $MgSO_4$. After suction filtration, the ethyl acetate was removed by distillation under a reduced pressure using a rotary evaporator to thereby obtain a crude dye. The crude dye was purified by recrystallization from $CH_2Cl_2$/methanol. In this way, the dye (102-C) was obtained. The amount of the product was 5.65 g and the yield was 90.6%.

(q) Specific Exemplary Compound: Synthesis of Dye 102

2-ethylhexanoyl chloride (1.5 mL) was gradually added dropwise to a solution that was composed of the dye (102-C) (3.12 g) dissolved in DMAc (50 mL) and was being stirred at an internal temperature of 5° C. The resulting reaction liquid was continuously stirred for 30 minutes. After that, ethyl acetate and a dilute hydrochloric acid aqueous solution were added to the reaction liquid for separatory extraction. The ethyl acetate layer was washed with a saturated sodium chloride aqueous solution and thereafter dried by $MgSO_4$. After suction filtration, the ethyl acetate was removed by distillation under a reduced pressure using a rotary evaporator. In this way, a crude dye (102) was obtained. The crude dye was purified by silica gel column chromatography (ethyl acetate/n-hexane). According to the procedure described above, the specific exemplary compound: dye (102) was obtained. The amount of the product was 3.39 g and the yield was 90.3%. $\lambda_{max}$=533.1 nm; $\epsilon_{max}$=4.38×10$^4$ (DMF solution).

Synthesis Example 3
(Synthesis of the Specific Exemplary Compound 122)

(r) Specific Exemplary Compound: Synthesis of Dye 122 m-Chlorosulfonylbenzoyl chloride (1.4 g) was gradually added to a solution that was composed of the dye (102-C) (3.12 g) dissolved in DMAc (50 mL) and was being stirred at an internal temperature of 5° C. The resulting reaction liquid was continuously stirred for 30 minutes. Next, a saturated sodium hydrogencarbonate aqueous solution was added to the reaction liquid and the reaction liquid was stirred for 30 minutes. Upon completion of the reaction, a saturated sodium chloride aqueous solution was added to the reaction liquid and the deposited crystals were collected by filtration. The crude dye underwent a desalting treatment and was thereafter purified by recrystallization from methanol.

According to the procedure described above, the specific exemplary compound: dye (122) was obtained. The amount of the product was 3.4 g and the yield was 82.5%. $\lambda_{max}$=534.2 nm; $\epsilon_{max}$=4.40×10$^4$(DMF solution).

[Inkjet Recording Ink]

The image-recording material containing the dye of the present invention may be any material for forming images, in particular color images. More specifically, the image-recording material containing the dye of the present invention may be an ink-jet recording material, a heat-sensitive transfer-type image-recording material, a pressure-sensitive recording material, an electrophotographic recording material, a transfer-type silver halide photosensitive material, a printing ink, a recording pen, or the like. Among these materials, the image-recording material containing the dye of the present invention is preferably an ink-jet recording material, a heat-sensitive transfer-type image-recording material, or an electrophotographic image-recording material, and more preferably an ink-jet recording material.

The ink-jet recording ink can be prepared by dissolving and/or dispersing the azo dye in an aqueous medium. If necessary, additives such as a surfactant, a drying-preventing agent (a humidifier), a stabilizer, an antiseptic, and the like can be added. In the case where the azo dye is dispersed in an aqueous medium, it is preferable to disperse colored particles comprising the azo dye and an oil-soluble polymer in an aqueous medium, to disperse the azo dye dissolved in a high-boiling organic solvent in an aqueous medium, or to disperse the azo in a solid state in an aqueous medium to thereby produce a dispersion of fine particles. At the time of dispersing, a dispersant or a surfactant can be used. Examples of the dispersing equipment that can be used include a simple stirrer or impeller, an in-line mixer, a mill (e.g., a colloid mill, a ball mill, a sand mill, an attritor, a roller mill, or an agitator mill), an ultrasonic disperser, and a high-pressure emulsifying disperser (high-pressure homogenizer: gorille homogenizer, micro-fluidizer, DeBEE 2000, etc. as commercially available machines). The details of the methods of preparing the ink-jet recording ink are described in JP-A Nos. 5-148436, 5-295312, 7-97541, 7-82515, 7-118584, and 11-286637, and Japanese Patent Application No. 2000-87539. These methods can also be utilized in the preparation of the ink-jet recording ink of the present invention.

The aqueous medium described above can be a mixture composed of water as a main component and a water-miscible organic solvent as an optional component. Examples of the water-miscible organic solvent include alcohols (e.g., methanol, ethanol, propanol, isopropanol, butanol, isobutanol, sec-butanol, t-butanol, pentanol, hexanol, cyclohexanol, and benzylalcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). These water-miscible organic solvents may be used in combinations of two or more.

It is preferable that the azo dye in an amount of 0.2 parts by weight or more and 10 parts by weight or less is incorporated in 100 parts by weight of the jet-recording ink of the present invention. The jet-recording ink of the present invention may contain other dyes together with the azo dye described above. In the case where two kinds or more of dyes are used, it is preferable that the total content of the dyes falls within the above-described range.

The viscosity of the ink-jet recording ink of the present invention is preferably 40 cp or less. The surface tension of the ink-jet recording ink of the present invention is preferably 200 $\mu$N/cm or more and 1000 $\mu$N/cm or less. The viscosity and the surface tension can be controlled by the addition of additives such as a viscosity-controlling agent, a surface tension-controlling agent, a specific resistance-controlling agent, a film-controlling agent, an ultraviolet absorber, an antioxidant, a browning inhibitor, a mildew-proofing agent, a corrosion inhibitor, a dispersant, and a surfactant.

The ink-jet recording ink of the present invention can be used not only for the formation of single-color images but also for the formation of full-color images. For the formation of full-color images, a magenta-colored ink, a cyan-colored ink, and a yellow-colored ink can be used. In addition, for the adjustment of colors, a black-colored ink may also be used.

[Ink-Jet Recording Method]

The ink-jet recording method according to the present invention comprises applying an energy to the ink-jet recording ink so that images are recorded on a conventionally known image-receiving material. Examples of the image-receiving material include plain paper, resin-coated paper such as paper exclusively for ink-jet recording described, for example, in JP-A Nos. 8-169172, 8-27693, 2-276670, 7-276789, 9-323475, 62-238783, 10-153989, 10-217473, 10-235995, 10-337947, 10-217597, and 10-337947, films, paper for both electrophotography and ink-jet recording, fabrics, glass, metals, and ceramics.

The recording paper and recording films, which are to be used for ink-jet printing using the ink of the present invention, are described below. The supports for use in the recording paper and recording films may be those produced by such equipment as a long-screen paper machine and a circular-screen paper machine and from pulps such as chemical pulps, e.g., LBKP and NBKP, mechanical pulps, e.g., GP, PGW, RMP, TMP, CTMP, CMP, and CGP, waste paper pulp, e.g., DIP, and, if necessary, additives such as conventionally known pigments, binders, sizing agents, fixing agents, cationic agents, and fortifiers may be included. Besides these materials, the supports may be synthetic paper or plastic film sheets. The thickness of the support is preferably 10 to 250 $\mu$m, and the weight is preferably 10 to 250 g/m$^2$. An ink-receiving layer and a back coat layer may be formed directly on the support. Alternatively, an ink-receiving layer and a back coat layer may be formed after a size press or anchor coat layer, which is made from starch, polyvinyl alcohol, or the like, is provided on the support. The support may be flattened by means of a calender such as a machine calender, a TG calender, or a soft calender. The support that is preferably used in the present invention is a paper whose both sides are laminated with a polyolefin (e.g., polyethylene, polystyrene, polyethylene terephthalate, polybutene, or a copolymer thereof) or a plastic film. It is preferable that the polyolefin contains a white pigment (e.g., titanium oxide, zinc oxide, or the like) or a bluing dye (e.g., cobalt blue, ultramarine blue, neodymium oxide, or the like).

The ink-receiving layer provided on the support contains a pigment and an aqueous binder. The pigment is preferably a white pigment. Examples of the white pigment include inorganic pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate and organic pigments such as a styrene-based pigment, an acryl-based pigment, a urea resin, and a melamine resin. The white pigment to be incorporated in the ink-receiving layer is preferably a porous inorganic pigment. Synthetic amorphous silica or the like having a high proportion of porous area is particularly preferable. The synthetic amorphous silica that can be used may be silicic acid anhydride produced by a dry process or hydrous silicic acid produced by a wet process. The use of hydrous silicic acid is particularly preferable.

Examples of the aqueous binder to be incorporated in the ink-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide, and derivatives of polyalkylene oxide and aqueous dispersions of polymers such as a styrene/butadiene latex and an acrylic emulsion. These aqueous binders may be used singly or in combinations of two or more. Among these aqueous binders, polyvinyl alcohol and silanol-modified polyvinyl alcohol are advantageously used in the present invention from the standpoint of adhesion to the pigment and peel resistance of the ink-receiving layer.

In addition to the pigment and aqueous binder, the ink-receiving layer may contain a mordant, a water-proofing agent, a lightfastness enhancer, a surfactant, and other additives.

It is preferable that the mordant to be incorporated in the ink-receiving layer is immobilized. Accordingly, a polymeric mordant is preferably used.

The polymeric mordants are described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236, and U.S. Pat. Nos. 2,484,430, 2,548,564, 3,148,061, 3,309,690, 4,115,124, 4,124,386,4, 193,800, 4,273,853, 4,282,305, and 4,450,224. The image-receiving materials containing the polymeric mordants described in JP-A No. 1-161236, pp.212~215, are particularly preferable. The use of the polymeric mordant described in this patent makes it possible to obtain images having excellent qualities and to improve the lightfastness of images.

The water-proofing agent is effective in increasing the water resistance of images. The water-proofing agent is preferably a cationic resin. Examples of the cationic resin include polyamide/polyamine/epichlorohydrin, polyethylene imine, polyamine sulfone, dimethyldiallylammonium chloride polymers, cationic polyacrylamide, and colloidal silica. Among these cationic resins, polyamide/polyamine/epichlorohydrin is preferable. The content of the cationic resin is preferably 1 to 15% by weight, more preferably 3 to 10% by weight, based on the total solid components of the ink-receiving layer.

Examples of the lightfastness enhancer include zinc sulfate, zinc oxide, hindered amine-based antioxidants, and benzotriazole-based ultraviolet light absorbers such as benzophenone. Among these substances, zinc sulfate is particularly preferable.

The surfactant functions as a coating aid, a peelability-improving agent, a slidability-improving agent, or an antistatic agent.

The surfactants are described in JP-A Nos.62-173463 and 62-183457. An organofluorine compound may be used in place of the surfactant. Preferably, the organofluorine compound is hydrophobic. Examples of the organofluorine compound include a fluorine-based surfactant, an oily fluorine-based compound (e.g., fluorine-based oil), and a solid fluorine-based resin (e.g., tetrafluoroethylene resin). The organofluorine compounds are described in JP-B No.57-9053 (columns 8 to 17), and JP-A Nos.61-20994 and 62-135826. Examples of other additives which may be added to the ink-receiving layer include a pigment dispersant, a thickener, a defoaming agent, a dye, a fluorescent brightener, an antiseptic, a pH controlling agent, a matting agent, a film hardener, and others. The ink-receiving layer may have a single-layer construction or a double-layer construction.

The recording paper or recording film may have a back coat layer. This layer may contain a white pigment, an aqueous binder, and other components. Examples of the white pigment to be incorporated in the back coat layer include white inorganic pigments such as light calcium carbonate, heavy calcium carbonate, kaolin, talc, calcium sulfate, barium sulfate, titanium dioxide, zinc oxide, zinc sulfide, zinc carbonate, titanium white, aluminum silicate, diatomaceous earth, calcium silicate, magnesium silicate, synthetic amorphous silica, colloidal silica, colloidal alumina, quasi-boehmite, aluminum hydroxide, alumina, lithopone, zeolite, hydrated halloysite, magnesium carbonate, and magnesium hydroxide, and organic pigments such as styrene-based plastic pigments, acryl-based plastic pigments, polyethylene, microcapsules, urea resins, and melamine resins.

Examples of the aqueous binder to be incorporated in the back coat layer include water-soluble polymers such as a styrene/maleic salt copolymer, a styrene/acrylic salt copolymer, polyvinyl alcohol, silanol-modified polyvinyl alcohol, starch, cationized starch, casein, gelatin, carboxymethyl cellulose, hydroxyethyl cellulose, and polyvinylpyrrolidone, and aqueous dispersions of polymers such as a styrene/butadiene latex and an acrylic emulsion. Other components which may be incorporated in the back coat layer include a defoaming agent, a foaming inhibitor, a dye, a fluorescent brightener, an antiseptic, a water-proofing agent, and others.

The layers constituting the ink-jet recording paper or recording film (including a back layer) may contain a polymer latex. The polymer latex is used for improvement of film physical properties such as dimension stabilization, curling prevention, adhesion prevention, and prevention of film cracking. The polymer latices are described in JP-A Nos. 62-245258, 62-131668, and 62-110066. The incorporation of a polymer latex having a low glass transition temperature (i.e., 40° C. or below) in the layer containing a mordant can prevent the cracking and curling of the layer. The incorporation of a polymer latex having a high glass transition temperature in the back layer can also prevent the cracking and curling of the layer.

The ink-jet recording methods using the ink of the present invention are not limited and conventionally known methods can be used. Examples of the methods include a charge-controlling method in which ink is ejected by use of electrostatic attraction, a drop-on-demand method (pressure pulse method) in which vibratory pressure of a piezoelectric element is used, an acoustic ink-jet method in which electric signals are converted into acoustic beams and the ink is irradiated with the acoustic beams so that the ink is ejected by use of the radiation pressure, and a thermal ink-jet method in which bubbles are formed by heating the ink and the pressure thus created is used. The ink-jet recording methods include a method in which many droplets, each made up of a small volume of a so-called photo-ink having a low concentration, are ejected, a method in which image quality is improved by use of plural kinds of ink each having substantially the same color but a different concentration, and a method in which colorless transparent ink is used.

EXAMPLES

The present invention is explained by way of the following examples. It should be noted that the present invention is not limited to these examples.

Example 1

(Preparation of Water-Based Ink)

While being heated at 30~40° C., the following components were stirred for 1 hour. After that, the liquid was subjected to pressurized filtration through a micro-filter having an average pore diameter of 0.8 µm and a diameter of 47 mm. In this way, an ink liquid A was prepared.

Composition of Ink Liquid A

| | |
|---|---|
| Azo dye (specific exemplary compound 122) | 4 parts by weight |
| Diethylene glycol | 9 parts by weight |
| Tetraethylene glycol monobutyl ether | 9 parts by weight |
| Glycerin | 7 parts by weight |
| Diethanolamine | 1 part by weight |
| Water | 70 parts by weight |

Ink liquids B~H were prepared in the same way as in the preparation of the ink liquid A, except that the azo dye was changed as shown in the following Table 1.

(Image Recording and Assessment)

Using each of the ink liquids A~H prepared above, images were recorded on photographic glossy paper (SUPER PHOTOGRADE, i.e., ink jet paper manufactured by Fuji Photo Film Co., Ltd.) by means of an ink-jet printer (PM-700C manufactured by Seiko-Epson Co., Ltd.).

Hue and lightfastness of the images obtained were assessed. As to the hue, the assessment was visually conducted and the results were expressed in 3 ratings of "Excellent", "Good", and "Poor". The results are shown in Table 1. In Table 1, ○ indicates that the hue was excellent; Δ: indicates that the hue was good; and X indicates that the hue was poor. The lightfastness assessment was conducted in the following way. Immediately after recording, the image density Ci was measured. After that, the image was irradiated with xenon light (85,000 lux) by means of a weather-o-meter (Atlas C. 165) for 7 days and again the image density Cf was measured. Using the difference in image density before and after the irradiation with xenon light, the dye retention rate ({(Ci−Cf)/Ci}×100%) was calculated and used for the assessment. The image density was measured using a reflection densitometer (X-Rite 310TR). The dye retention rate was measured at 3 points of reflection densities, i.e., 1, 1.5, and 2.0. The ratings are shown in Table 1. In Table 1, ○ indicates that the dye retention rate was 80% or more at all of the densities; Δ: indicates that the dye retention rate was less than 80% at two of the densities; and X indicates that the dye retention rate was less than 80% at all of the densities. The ozone gas resistance test was conducted in the following way. The image immediately after being recorded was placed in a box in which the ozone gas concentration was set to 0.5 ppm for 24 hours. Before and after the exposure to the ozone gas, the image densities were measured using a reflection densitometer (X-Rite 310TR) and the ozone gas resistance was assessed based on the dye retention rate. The dye retention rate was measured at 3 points of reflection densities, i.e., 1, 1.5, and 2.0. The ozone gas concentration inside the box was set by means of an ozone gas monitor (Model: OZG-EM-01) manufactured by APPLICS. The assessment results were expressed in 3 ratings. That is, ○ indicates that the dye retention rate was 70% or more at all of the densities; Δ: indicates that the dye retention rate was less than 70% at one or two of the densities; and X indicates that the dye retention rate was less than 70% at all of the densities.

TABLE 1

| ink liquid | dye | hue (rating) | lightfastness rating | ozone resistance rating |
| --- | --- | --- | --- | --- |
| A | azo dye 122 | magenta (○) | ○ | ○ |
| B | azo dye 123 | magenta (○) | ○ | ○ |
| C | azo dye 125 | magenta (○) | ○ | ○ |
| D | azo dye 126 | magenta (○) | ○ | ○ |
| E | comparative dye (A)* | magenta (Δ) | X | ○ |
| F | comparative dye (B)* | magenta (X) | Δ | X |
| G | comparative dye (C)* | magenta (X) | Δ | X |
| H | comparative dye (D)* | magenta (X) | Δ | X |

*Comparative dyes (A) to (D) are indicated below.

(Comparative dye A)

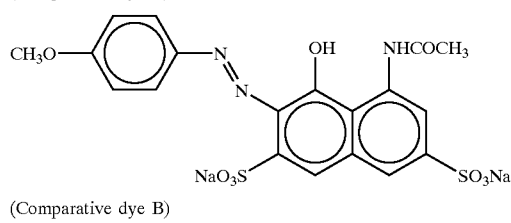

(Comparative dye B)

TABLE 1-continued

| ink liquid | dye | hue (rating) | lightfastness rating | ozone resistance rating |
| --- | --- | --- | --- | --- |

(Comparative dye C)

(Comparative dye D)

As can be seen from the results shown in Table 1, the magenta images formed from the ink liquids A~D were clearer than the magenta images formed from the ink liquids E~H. The images formed by using the ink liquids A~D exhibited superior lightfastness.

Further, using each of the ink liquids A~D, images were recorded on special use super fine glossy paper for special purpose (MJA4S3P manufactured by Seiko-Epson Co., Ltd.) by means of an ink-jet printer (PM-700C manufactured by Seiko-Epson Co., Ltd.). Assessment of the hue and lightfastness of the images obtained gave the same results as those of Table 1.

Example 2

(Preparation of Sample 101)

5.63 g of an azo dye (specific exemplary compound 101: an oil-soluble dye), 7.04 g of sodium dioctylsulfosuccinate, 4.22 g of a high-boiling organic solvent (S-2) shown below and 5.63 g of a high-boiling organic solvent (S-11) shown below were dissolved in 50 mL of ethyl acetate at 70° C. After that, 500 mL of deionized water was added to the solution, which was being stirred by means of a magnetic stirrer, so as to prepare an oil-in-water type, coarse dispersion. The coarse dispersion thus obtained was passed through a micro-fluidizer (MICROFLUIDEX INC.) 5 times under a pressure of 600 bar so as to obtain an emulsion having finer particles. Next, the emulsion underwent a solvent-removing treatment by means of a rotary evaporator until the smell of ethyl acetate was lost. In this way, a fine emulsion of a hydrophobic dye was obtained. Then, 140 g of diethylene glycol, 50 g of glycerin, 7 g of SURFYNOL 465 (Air Products & Chemicals Inc.), and 900 mL of deionized water were added to the fine emulsion to thereby prepare ink Sample 101.

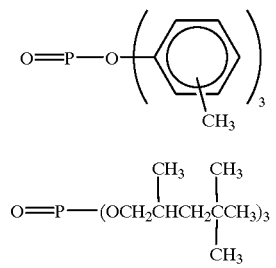

S-2

S-11

(Preparation of Samples 102~110)

Samples 102~110 were prepared in the same way as in the preparation of Sample 101, except that the azo dye (specific exemplary compound 101: an oil-soluble dye) was replaced by the azo dyes (oil-soluble dyes) as shown in the following Table 2. The volume-average particle sizes of the emulsified dispersions of ink Samples 101~110 were measured by means of MICROTRACK UPA (Nikkisou Co., Ltd.). The results are shown in Table 2.

(Image Recording and Assessment)

The ink samples 101~110 and the comparative ink sample underwent the following assessment. The results are shown in Table 2.

In Table 2, "color", "paper dependence", "water resistance", and "lightfastness" are the test results of the images which were recorded on photographic glossy paper (PHOTOGRADE, i.e., ink jet paper manufactured by Fuji Photo Film Co., Ltd.) by means of an ink-jet printer (PM-700C manufactured by Epson Co., Ltd.).

<Color>

Reflection spectra of the recorded image were measured in a 390 to 730 nm region at an interval of 10 nm and a* and b* were calculated according to CIE L*a*b* color space. Preferable colors as magenta were defined as follows.

Preferable a*: 76 or more

Preferable b*: −30 or more and 0 or less

A: both a* and b* are inside the preferable region

B: either a* or b* is inside the preferable region

C: both a* and b* are outside the preferable region

<Paper Dependence>

Comparison was made between the image formed on the photographic glossy paper and the image formed on PPC plain paper. If the difference between the two images was small, it was graded as A (good), whereas, if the difference between the two images was large, it was graded as B (poor). In this way, the difference was assessed according to the two grades.

<Water Resistance>After an image was formed on the photographic glossy paper, the paper was dried for one hour at room temperature. After that, the paper was immersed in water for 30 seconds and thereafter left to dry naturally at room temperature. The blur on the paper was inspected. The blur was expressed by the following 3 ratings. A: free from blur; B: slight blur; C: significant blur.

<Lightfastness>The photographic glossy paper having an image formed thereon was irradiated with xenon light (85,000 lx) by means of a weather-o-meter (Atlas C. 165) for 3 days. Before and after the xenon irradiation, the image densities were measured using a reflection densitometer (X-Rite 310TR) and the values obtained were used for the calculation of the dye retention rate. The measurement was made at 3 points of reflection densities, i.e., 1, 1.5, and 2.0.

The dye retention rate was expressed by the following 3 ratings: A indicates that the dye retention rate was 70% or more at all of the densities; B indicates that the dye retention rate was less than 70% at one or two of the densities; and C indicates that the dye retention rate was less than 70% at all of the densities.

<Ozone Gas Resistance>

The photographic glossy paper having an image formed thereon was placed in a box in which the ozone gas concentration was set to 0.5 ppm for 24 hours. Before and after the exposure to the ozone gas, the image densities were measured using a reflection densitometer (X-Rite 310TR) and the ozone gas resistance was assessed based on the dye retention rate. The measurement was made at 3 points of reflection densities, i.e., 1, 1.5, and 2.0. The ozone gas concentration inside the box was set by means of an ozone gas monitor (Model: OZG-EM-01) manufactured by APPLICS.

The ozone gas resistance was expressed by the following 3 ratings: A indicates that the dye retention rate was 70% or more at all of the densities; B indicates that the dye retention rate was less than 70% at one or two of the densities; and C indicates that the dye retention rate was less than 70% at all of the densities.

TABLE 2

| Sample No. | dye | particle diameter (nm) | color | paper dependence | water resistance | Light-fastness | ozone resistance |
| --- | --- | --- | --- | --- | --- | --- | --- |
| comparative sample | Comparative dye D | — | B | B | B | B | C |
| sample 101 | 101 | 58 | A | A | A | A | A |
| sample 102 | 102 | 50 | A | A | A | A | A |
| sample 103 | 103 | 62 | A | A | A | A | A |
| sample 104 | 105 | 61 | A | A | A | A | A |
| sample 105 | 106 | 59 | A | A | A | A | A |
| sample 106 | 107 | 63 | A | A | A | A | A |
| sample 107 | 110 | 69 | A | A | A | A | A |
| sample 108 | 113 | 67 | A | A | A | A | A |
| sample 109 | 114 | 83 | A | A | A | A | A |
| sample 110 | 121 | 79 | A | A | A | A | A |

As can be seen from Table 2, the jet printing ink of the present invention exhibits excellent color developability, excellent color, little dependence on paper, superior water resistance, and superior lightfastness.

Example 3

The ink prepared in Example 2 was loaded into a cartridge of an ink-jet printer BJ-F850 (manufactured by Canon Inc.). Using the printer and photographic glossy paper GP-301 manufactured by Canon Inc., images were printed. The prints underwent the same assessments as in Example 2 and the same results as in Example 2 were obtained.

The present invention makes it possible (1) to provide a novel heterylaniline azo dye derivative having a specific structure which is useful as a dye for ink jet printing ink or as an intermediate for synthesis of the dye, and can be an intermediate for useful chemical, medical, or agricultural organic chemical compounds and (2) to provide an ink-jet recording ink and an ink-jet recording method which, by use of the heterylaniline azo dye derivative, enable the formation of images having excellent hue and excellent durability to light and ozone gas.

What is claimed is:

1. An ink-jet recording ink comprising the azo dye represented by the following general formula (I):

General Formula (I)

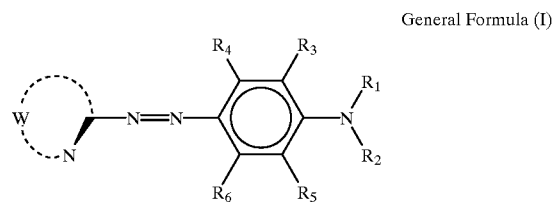

wherein $R_1$ represents a substituted or unsubstituted aryl group or a substituted or unsubstituted heterocyclic group; $R_2$ represents a hydrogen atom, a substituted or unsubstituted alkyl group, a substituted or unsubstituted aryl group, a substituted or unsubstituted cycloalkyl group, a substituted or unsubstituted alkenyl group, a substituted or unsubstituted aralkyl group, or a substituted or unsubstituted heterocyclic group; $R_3$, $R_4$, $R_5$, and $R_6$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imide group, a heterocyclothio group, a sulfinyl group, a phosphoryl group, an acyl group, or an ionic hydrophilic group, which groups may each have a substituent; any of each $R_1$ and $R_2$, $R_3$ and $R$ , and $R_2$ and $R_5$ may be bonded to form a ring; and W represents a group of atoms necessary for forming a nitrogen-containing, 5- to 8-membered heterocycle ring which may be condensed with other ring to form a condensed ring, wherein the nitrogen-containing heterocycle, which is made up of the group W of atoms, and the condensed ring of the heterocycle in the general formula (I) are selected from the group consisting of imidazole, benzimidazole, pyrazole, triazole, thiazole, benzothiazole, isothiazole, benzisothiazole, oxazole, benzoxazole, thiadiazole, 3H-pyrrole, 3H-indole, isoxazole, and benzisoxazole.

2. An ink-jet recording ink according to claim 1, wherein $R_2$ in the general formula (I) is a substituent selected from the group consisting of a substituted or unsubstituted alkyl group and a substituted or unsubstituted aryl group.

3. An ink-jet recording ink according to claim 1, wherein $R_3$, $R_4$, and $R_5$ in the general formula (I) are each a hydrogen atom.

4. An ink-jet recording ink according to claim 1, wherein $R_6$ in the general formula (I) is a substituent selected from the group consisting of an amide group, a ureido group, and a sulfonamide group.

5. An ink-jet recording ink according to claim 1, wherein the ionic hydrophilic group is a carboxyl group or a sulfo group.

6. An ink-jet recording ink according to claim 1, wherein any one group of $R_1$ and $R_2$, $R_3$ and $R_1$, and $R_2$ and $R_5$ in the general formula (I) forms a ring indicated by one of the following formulae:

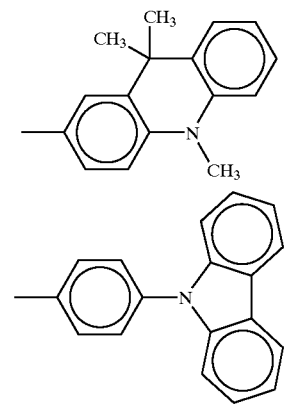

7. An ink-jet recording ink according to claim 1, wherein the ink-jet recording ink can be prepared by dissolving and/or dispersing the azo dye in an aqueous medium.

8. An ink-jet recording ink according to claim 1, wherein the azo dye represented by the general formula (I) is the azo dye represented by the general formula (II):

General Formula (II)

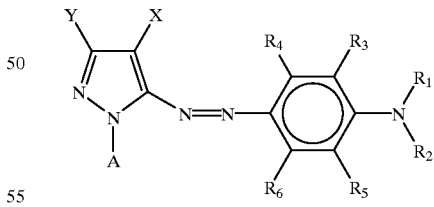

wherein $R_1$, $R_2$ $R_3$, $R_4$, $R_5$, and $R_6$ are defined in the same way as $R_1$, $R_2$, $R_3$, $R_4$, $R_5$, and $R_6$ in the general formula (I), respectively; X represents an electron-withdrawing group having a Hammett's constant $\sigma_p$ of 0.20 or greater; Y represents a substituted or unsubstituted secondary or tertiary alkyl group, a substituted or unsubstituted aryl group, or a substituted or unsubstituted heterocyclic group; and A represents a group made up of nonmetallic atoms necessary for forming a 5- to 8-membered ring which may have a substituent and may be a saturated ring or may have an unsaturated bond.

9. An ink-jet recording ink according to claim 8, wherein X in the general formula (II) is a substituent selected from the group consisting of a cyano group, an alkylsulfonyl group having 1 to 12 carbon atoms, and an arylsulfonyl group having 6 to 18 carbon atoms.

10. An ink-jet recording ink according to claim 8, wherein Y in the general formula (II) is a substituent selected from the group consisting of a secondary or tertiary alkyl group and an aryl group.

11. An ink-jet recording ink according to claim 8, wherein the ionic hydrophilic group is a carboxyl group or a sulfo group.

12. An ink-jet recording ink according to claim 8, wherein A in the general formula (II) is represented by any one of the following general formulae (III):

General Formulae (III)

(III-1)
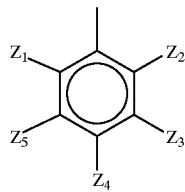

(III-2)
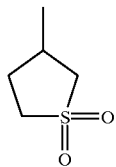

(III-3)
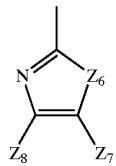

(III-4)
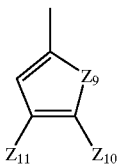

(III-5)
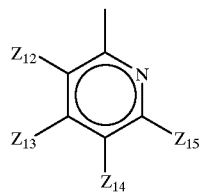

(III-6)
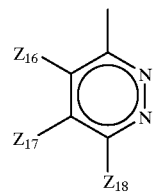

(III-7)
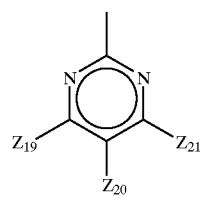

(III-8)
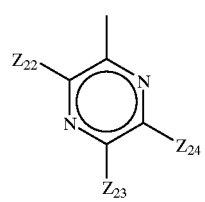

(III-9)
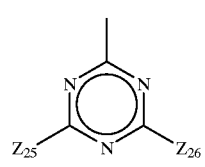

wherein $Z_1$, $Z_2$, $Z_3$, $Z_4$, $Z_5$, $Z_7$, $Z_8$, $Z_{10}$, $Z_{11}$, $Z_{12}$, $Z_{13}$, $Z_{14}$, $Z_{15}$, $Z_{16}$, $Z_{17}$, $Z_{18}$, $Z_{19}$, $Z_{20}$, $Z_{21}$, $Z_{22}$, $Z_{23}$, $Z_{24}$, $Z_{25}$, and $Z_{26}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imide group, a heterocyclothio group, a sulfinyl group, a phosphoryl group, an acyl group, or an ionic hydrophilic group; and $Z_6$ and $Z_9$ each independently represents —$NR_7$—, an oxygen atom, or a sulfur atom, where $R_7$ represents a hydrogen atom or a substituent.

13. An ink-jet recording ink according to claim 1, wherein the azo dye in an amount between 0.2 and 10 parts by weight is incorporated in 100 parts by weight of the ink-jet recording ink.

14. An ink-jet recording method in which an image is formed on an image-receiving material comprising a support having thereon an ink-receiving layer containing white inorganic pigment particles by using an inkjet recording ink comprising the azo dye represented by the following general formula (I):

General Formula (I)

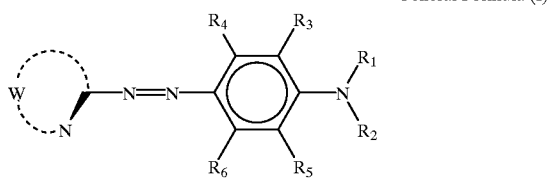

wherein $R_1$ represents a substituted or unsubstituted aryl group or a substituted or unsubstituted heterocyclic group; $R_2$ represents a hydrogen atom, a substituted or unsubstituted alkyl group, a substituted or unsubstituted aryl group, a substituted or unsubstituted cycloalkyl group, a substituted or unsubstituted alkenyl group, a substituted or unsubstituted aralkyl group, or a substituted or unsubstituted heterocyclic group; $R_3$, $R_4$, $R_5$, and $R_6$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imide group, a heterocyclothio group, a sulfinyl group, a phosphoryl group, an acyl group, or an ionic hydrophilic group, which groups may each have a substituent; any of $R_1$ and $R_2$, $R_3$ and $R_1$, and $R_2$ and $R_5$ may be bonded to form a ring; and W represents a group of atoms necessary for forming a nitrogen-containing 5- to 8-membered heterocycle ring which may be condensed with other ring to form a condensed ring, wherein the nitrogen-containing heterocycle, which is made up of the group W of atoms, and the condensed ring of the heterocycle in the general formula (I) are selected from the group consisting of imidazole, benzimidazole, pyrazole, triazole, thiazole, benzothiazole, isothiazole, benzisothiazole, oxazole, benzoxazole, thiadiazole, 3H-pyrrole, 3H-indole, isoxazole, and benzisoxazole.

15. An ink-jet recording method according to claim 14, wherein the ink-jet recording ink comprising the azo dye represented by the general formula (I) is an inkjet recording ink comprising the azo dye represented by the following general formula (II):

General Formula (II)

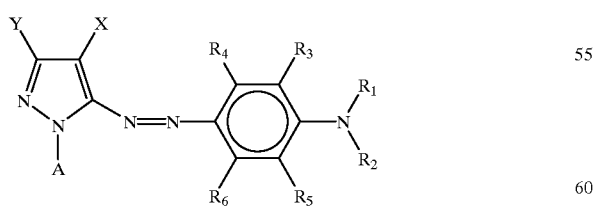

wherein $R_1$, $R_2$, $R_3$, $R_4$, $R_5$, and $R_6$ are defined in the same way as $R_1$, $R_2$, $R_3$, $R_4$, $R_5$, and $R_6$ in the general formula (I), respectively; X represents an electron-withdrawing group having a Hammett's constant $\sigma_p$ of 0.20 or greater; Y represents a substituted or unsubstituted secondary or tertiary alkyl group, a substituted or unsubstituted aryl group, or a substituted or unsubstituted heterocyclic group; and A represents a group made up of nonmetallic atoms necessary for forming a 5- to 8-membered ring which may have a substituent and may be a saturated ring or may have an unsaturated bond.

16. An ink-jet recording method according to claim 15, wherein A in the general formula (II) is represented by any one of the following general formulae (III):

General Formulae (III)

(III-1)

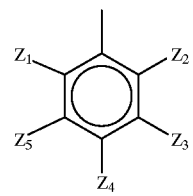

(III-2)

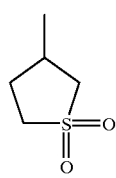

(III-3)

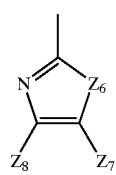

(III-4)

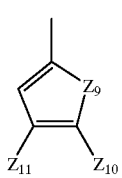

(III-5)

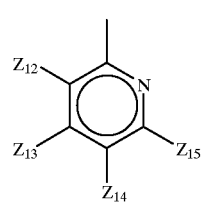

(III-6)

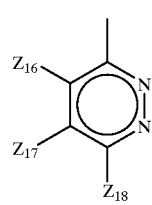

-continued

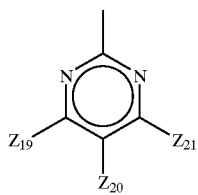
(III-7)

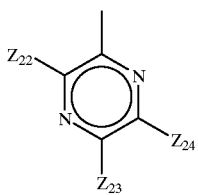
(III-8)

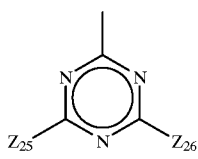
(III-9)

17. An azo dye represented by the general formula (IV):

General Formula (IV)

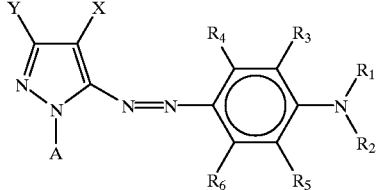

wherein X represents an electron-withdrawing group having a Hammett's constant $\sigma_p$ of 0.20 or greater; $R_1$ represents a substituted or unsubstituted aryl group or a substituted or unsubstituted heterocyclic group; $R_2$ represents a hydrogen atom, a substituted or unsubstituted alkyl group, a substituted or unsubstituted aryl group, a substituted or unsubstituted cycloalkyl group, a substituted or unsubstituted alkenyl group, a substituted or unsubstituted aralkyl group, or a substituted or unsubstituted heterocyclic group; $R_3$, $R_4$, $R_5$, and $R_6$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imide group, a heterocyclothio group, a sulfinyl group, a phosphoryl group, an acyl group, or an ionic hydrophilic group, with the proviso that these groups may each have a substituent and any of each $R_1$ and $R_2$, $R_3$ and $R_1$, and $R_2$ and $R_5$ may be bonded to form a ring; Y represents a substituted or unsubstituted secondary or tertiary alkyl group, a substituted or unsubstituted aryl group, or a substituted or unsubstituted heterocyclic group; and A represents a group made up of nonmetallic atoms necessary for forming a 5- to 8-membered ring which may have a substituent and may be a saturated ring or may have an unsaturated bond.

18. An azo dye according to claim 7, wherein A in the general formula (IV) is represented by any one of the following general formulae (V):

General Formulae (V)

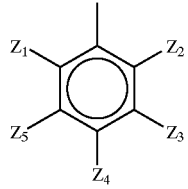
(V-1)

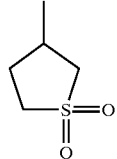
(V-2)

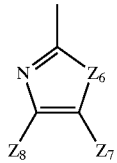
(V-3)

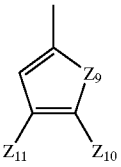
(V-4)

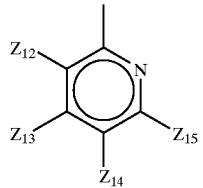
(V-5)

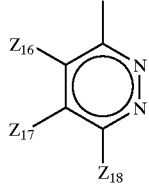
(V-6)

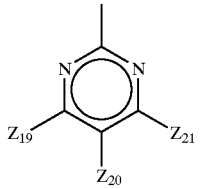
(V-7)

-continued (V-8)

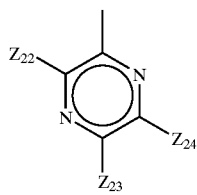

(V-9)

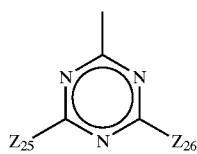

in the general formulae (V), $Z_1$, $Z_2$, $Z_3$, $Z_4$, $Z_5$, $Z_7$, $Z_8$, $Z_{10}$, $Z_{11}$, $Z_{12}$, $Z_{13}$, $Z_{14}$, $Z_{15}$, $Z_{16}$, $Z_{17}$, $Z_{18}$, $Z_{19}$, $Z_{20}$, $Z_{21}$, $Z_{22}$, $Z_{23}$, $Z_{24}$, $Z_{25}$, and $Z_{26}$ represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imide group, a heterocyclothio group, a sulfinyl group, a phosphoryl group, an acyl group, or an ionic hydrophilic group; and $Z_6$ and $Z_9$ each independently represents —$NR_7$—, an oxygen atom, or a sulfur atom, where $R_7$ represents a hydrogen atom or a substituent.

19. An ink-jet recording ink comprising the azo dye represented by the following general formula (I):

General Formula (I)

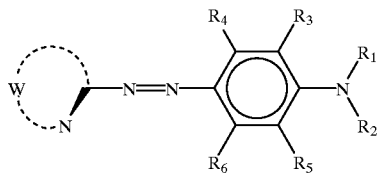

wherein $R_1$ represents a substituted or unsubstituted aryl group or a substituted or unsubstituted heterocyclic group; $R_2$ represents a hydrogen atom, a substituted or unsubstituted alkyl group, a substituted or unsubstituted aryl group, a substituted or unsubstituted cycloalkyl group, a substituted or unsubstituted alkenyl group, a substituted or unsubstituted aralkyl group, or a substituted or unsubstituted heterocyclic group; $R_3$, $R_4$, $R_5$, and $R_6$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imide group, a heterocyclothio group, a sulfinyl group, a phosphoryl group, an acyl group, or an ionic hydrophilic group, which groups may each have a substituent; any of each $R_1$ and $R_2$, $R_3$ and $R_1$, and $R_2$ and $R_5$ may be bonded to form a ring; and W represents a group of atoms necessary for forming a nitrogen-containing, 5- to 8-membered heterocycle ring which may be condensed with other ring to form a condensed ring, wherein $R_6$ in the general formula (I) is a substituent selected from the group consisting of an amide group, a ureido group, and a sulfonamide group.

20. An inkjet recording ink comprising the azo dye represented by the following general formula (I):

General Formula (I)

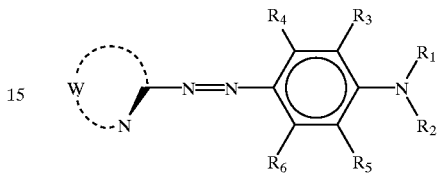

wherein $R_1$ represents a substituted or unsubstituted aryl group or a substituted or unsubstituted heterocyclic group; $R_2$ represents a hydrogen atom, a substituted or unsubstituted alkyl group, a substituted or unsubstituted aryl group, a substituted or unsubstituted cycloalkyl group, a substituted or unsubstituted alkenyl group, a substituted or unsubstituted aralkyl group, or a substituted or unsubstituted heterocyclic group; $R_3$, $R_4$, $R_5$, and $R_6$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imide group, a heterocyclothio group, a sulfinyl group, a phosphoryl group, an acyl group, or an ionic hydrophilic group, which groups may each have a substituent; any of each $R_1$ and $R_2$, $R_3$ and $R_1$, and $R_2$ and $R_5$ may be bonded to form a ring; and W represents a group of atoms necessary for forming a nitrogen-containing, 5- to 8-membered heterocycle ring which may be condensed with other ring to form a condensed ring, wherein any one group of $R_1$ and $R_2$, $R_3$ and $R_1$, and $R_2$ and $R_5$ in the general formula (I) forms a ring indicated by one of the following formulae:

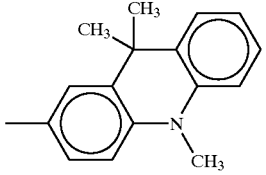

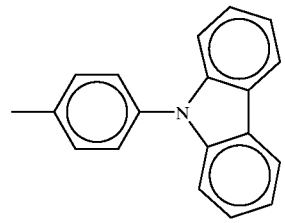

\* \* \* \* \*